(12) United States Patent
Shoup

(10) Patent No.: US 6,902,010 B2
(45) Date of Patent: Jun. 7, 2005

(54) FOLDABLE IMPLEMENT FRAME AND HITCH

(76) Inventor: Kenneth E. Shoup, 17649 Richmond, Plainfield, IL (US) 60544

( * ) Notice: Subject to any disclaimer, the term of this patent is extended or adjusted under 35 U.S.C. 154(b) by 65 days.

(21) Appl. No.: 10/463,684

(22) Filed: Jun. 16, 2003

(65) Prior Publication Data

US 2004/0050563 A1 Mar. 18, 2004

Related U.S. Application Data

(63) Continuation-in-part of application No. 09/552,943, filed on Apr. 20, 2000, now Pat. No. 6,408,950.
(60) Provisional application No. 60/390,240, filed on Jun. 17, 2002.

(51) Int. Cl.[7] .............................................. A01B 63/00
(52) U.S. Cl. ........................ 172/456; 172/311; 172/111; 172/57; 280/656
(58) Field of Search ................................. 172/311, 456, 172/452, 776, 457, 470, 481, 669, 397, 407; 111/54, 55, 57; 280/656

(56) References Cited

U.S. PATENT DOCUMENTS

| | | | | |
|---|---|---|---|---|
| 3,505,704 A | * | 4/1970 | Hornung et al. ............ 16/367 |
| 4,340,239 A | * | 7/1982 | Shoup ...................... 280/416.2 |
| 4,364,581 A | * | 12/1982 | Shoup ......................... 172/311 |
| 4,502,546 A | * | 3/1985 | Moos ......................... 172/311 |
| 4,504,076 A | * | 3/1985 | Bedney ...................... 172/311 |
| 4,529,040 A | * | 7/1985 | Grollimund ................. 172/311 |
| 4,664,202 A | * | 5/1987 | Applequist et al. ......... 172/311 |
| 4,723,787 A | * | 2/1988 | Hadley et al. .............. 172/311 |
| 5,113,956 A | * | 5/1992 | Friesen et al. ............. 172/311 |
| 5,488,996 A | * | 2/1996 | Barry et al. ................ 172/311 |
| 5,647,440 A | * | 7/1997 | Barry et al. ................ 172/311 |
| 6,092,609 A | * | 7/2000 | Jeffery et al. ............... 172/311 |
| 6,408,950 B1 | * | 6/2002 | Shoup ......................... 172/311 |

* cited by examiner

*Primary Examiner*—Victor Batson
(74) *Attorney, Agent, or Firm*—Emrich & Dithmar LLC; Harry M. Levy

(57) ABSTRACT

A foldable implement frame and hitch having a front end for attachment to a draft vehicle having dedicated transport wheels movable between a stored position wherein the transport wheels are out of contact with the ground and a transport position wherein the dedicated transport wheels engage the ground and support the implement frame. The dedicated transport wheels are longitudinally movable along one of the telescoping main frame members toward and away from the draft vehicle to change the center of gravity of said foldable implement frame. Additional pivots in the wings provide greater contouring following capabilities.

23 Claims, 26 Drawing Sheets

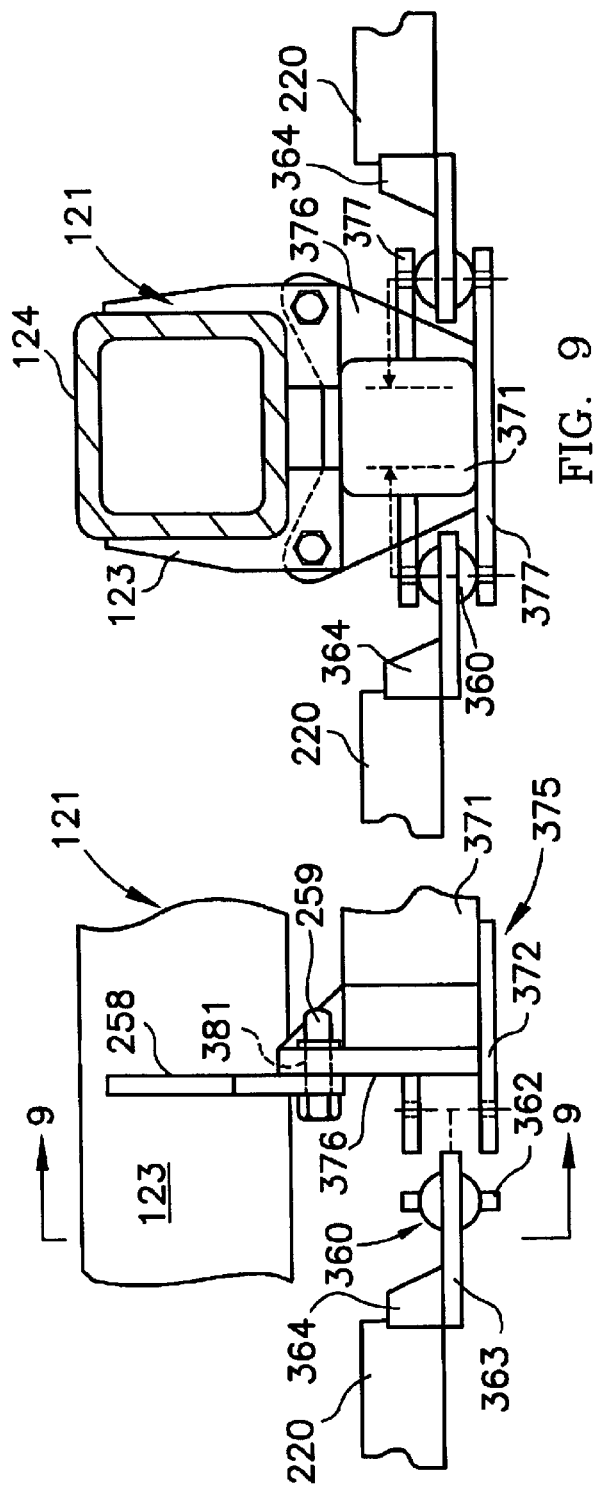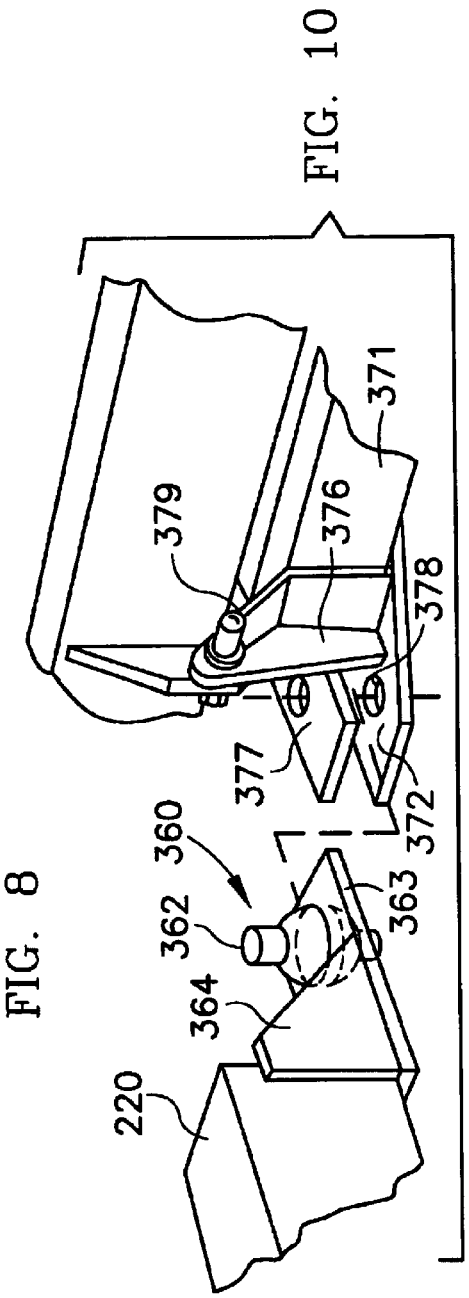

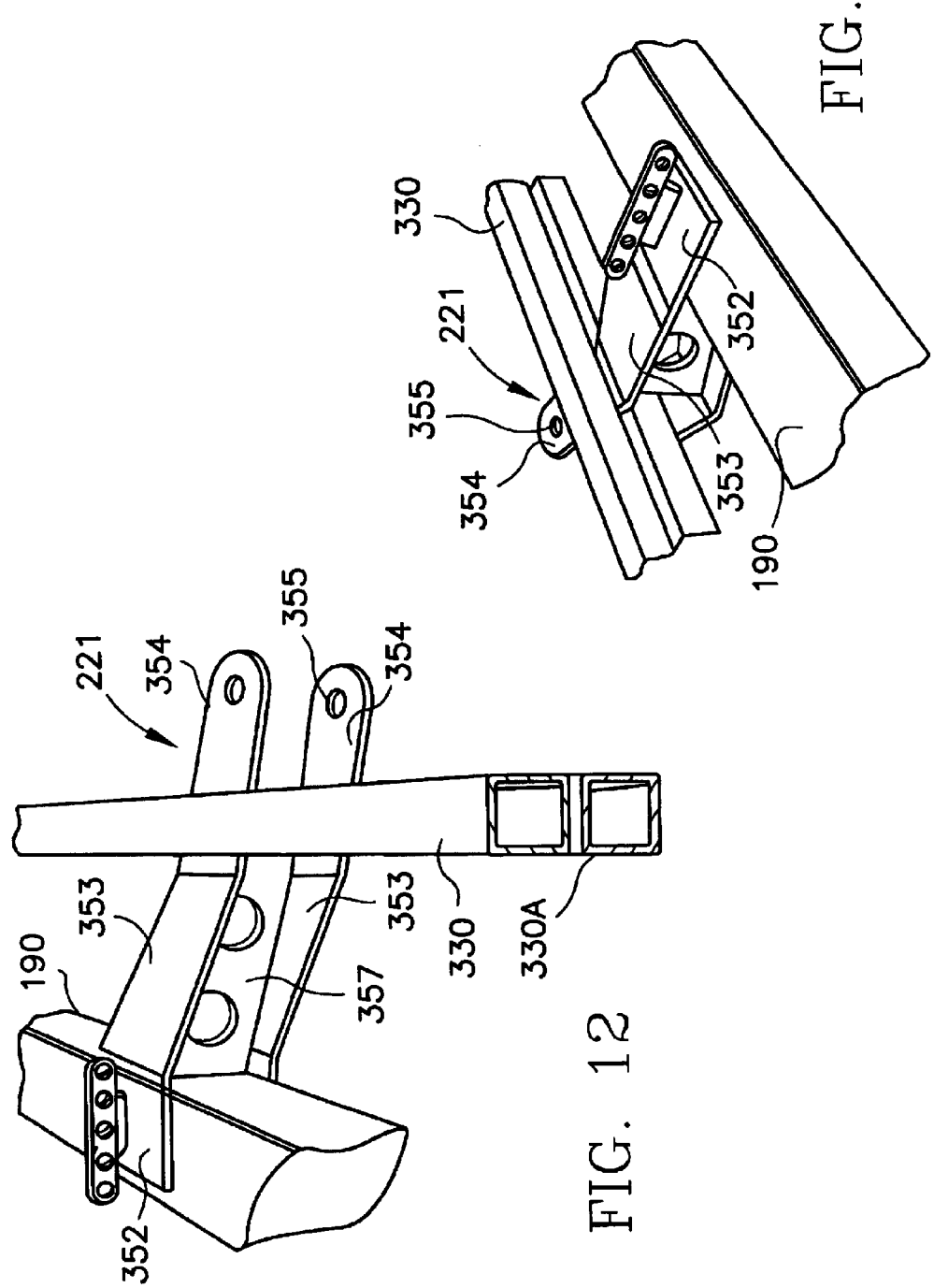

FOLDABLE IMPLEMENT FRAME AND HITCH

RELATED APPLICATIONS

This application, pursuant to 37 C.F.R. 1.78(c), claims priority based on provisional application Ser. No. 60/390,240, filed on Jun. 17, 2002.

This is a continuation-in-part of my prior patent application Ser. No. 09/552,943 filed Apr. 20, 2000, now U.S. Pat. No. 6,408,950.

PRIOR ART

The present invention relates generally to improvements in foldable implement frames and hitches, and specifically to improvements in the foldable implement frame disclosed in U.S. Pat. Nos. 4,364,581 and 6,408,950, the entire disclosures of which are incorporated herein by reference.

Implement frames and hitches are used to carry a wide variety of implements such as an air-injection planter for corn and other hard kernel grains, rotary hoes, "duck-foot" field cultivators, and the like. It is desirable that such implement frames have a wide span in the work position thereof so that a plurality of rows of crops can be simultaneously cultivated during a single pass. However, when it is time to transport the implement frame from field to field or along a highway, it is desirable that the horizontal extent of the implement frame be small so as to negotiate gates, highway lanes and the like with ease.

One form of standard practice heretofore has been to make the implement frame foldable between an extended working position and a retracted transport position with the addition of transport wheels when the parts are in the transport position. The closest prior art is my previous U.S. Pat. No. 4,364,581. Other patents owned by Kinze Mfg. Co. and John Deere were cited during the prosecution of my prior patent and are generally relevant to this invention. For the most part, the planter of the present invention operates similarly to that described in my prior patent. That machine hereafter the '581 machine, was entirely satisfactory for its intended purposes; however, there always is room for improvement. Where possible, I have used the same reference numerals to refer to the same or similar parts in this application as compared to U.S. Pat. No. 4,364,851.

SUMMARY OF THE INVENTION

An object of the present invention is to improve the '581 machine by making it stronger, safer in transport, more versatile, simpler and faster to operate while retaining the beneficial features thereof by employing the dedicated transport wheels, the parent U.S. Pat. No. 6,408,950 mounted for longitudinal movement to change the center of gravity of the planter.

Further features of the invention pertain to the particular arrangement of the parts of the foldable implement frame and hitch, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 8 is an enlarged partial view, partly expanded, of the juncture of the wing braces and the main frame in the extended working positions and showing the stabilizing lock;

FIG. 9 is a sectional view of the device illustrated in FIG. 8 as seen along lines 9—9 thereof;

FIG. 10 is an enlarged perspective view of the device illustrated in FIG. 8;

FIG. 12 is an enlarged perspective view of the connection between the wing frame and stiffening members;

FIG. 13 is a further enlarged view of the members shown in FIG. 12 from a different view;

DESCRIPTION OF THE PREFERRED EMBODIMENT

Figure 1:
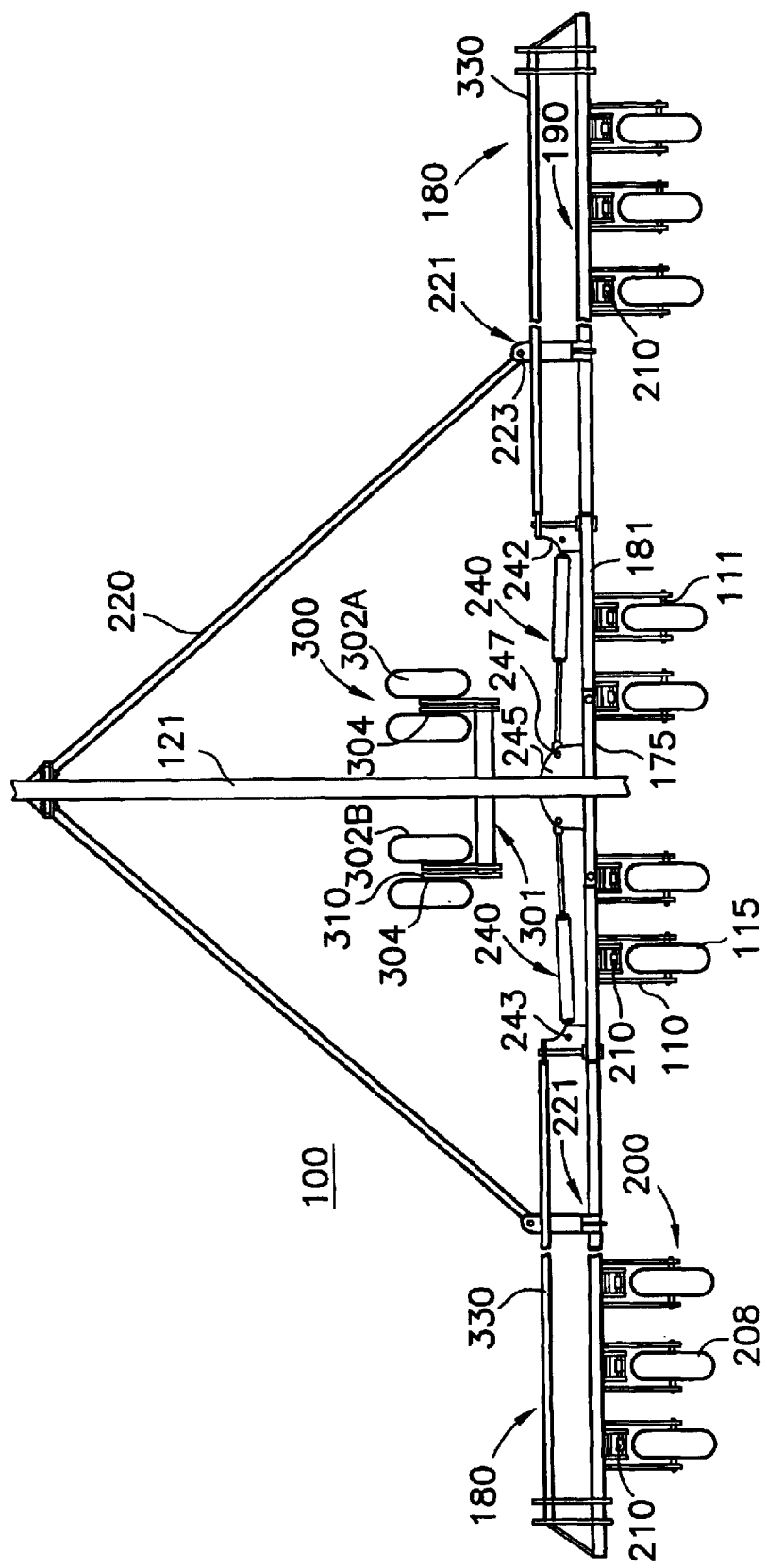
FIG. 1 is a plan view of a foldable implement frame and hitch made in accordance with and embodying the principles of the present invention, the parts of the frame and hitch being shown in the extended working positions.
Figure 2:
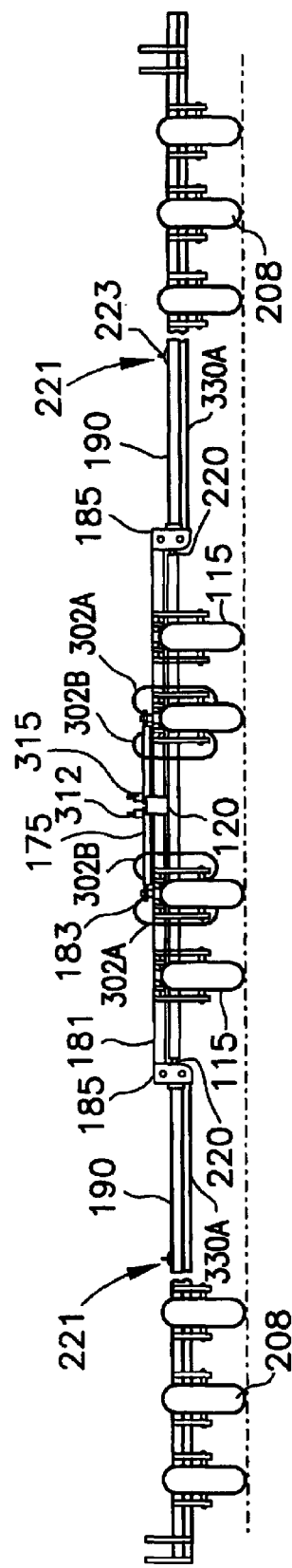
FIG. 2 is a rear plan view of the device illustrated in FIG. 1.

There is illustrated in FIGS. 1–4 of the drawings a foldable implement frame and hitch 100 made in accordance with and embodying the principles of the present invention, the foldable implement frame and hitch 100 including a support frame 101 carried by a plurality of center field wheels 115 and having fixedly connected thereto a main frame 120 having an outer longitudinal frame member 121 telescopically receiving therein an inner longitudinal frame member 125. Secured to the support frame 101 are two folding wings 180 supported at the outer ends by wing wheel assemblies 200 and provided with wing braces 220.

The implement frame 100 is preferably drawn by a tractor or draft vehicle (not shown) carrying the usual three-point hitch (not shown) that provides a draft connection and which also can be used to elevate the connected portion of the implement frame 100. The support frame 101 (see FIGS. 5–7 and 16) is formed as a hollow box and extends transversely of the implement frame 100. Mounted on the lower portion of the support frame 101 are spaced apart bearing members 105 (FIG. 15) extending slightly forwardly and pivotally supporting a transversely extending wheel mount member or rock shaft 106. The wheel mount member or rock shaft 106 has four pair of struts 110 extending rearwardly and downwardly therefrom, each pair of the struts 110 carrying an axle 111 on which is mounted one of the center field wheels 115. The four center field wheels 115 support the frame 101 in the field, but unlike the '581 machine do not support the frame 101 during transport.

The main frame 120 extends longitudinally and normal to the support frame 101 and includes the two telescoping frame members 121 and 125, the outer frame member 121 being hollow and of rectangular cross section (see FIGS. 8–11) and telescopically receiving therein the inner longitudinal frame member 125 that is also hollow and of rectangular cross section. The frame members 121 and 125 are substantially the same as disclosed in the '581 patent and operate in the same manner.

In order to raise and lower the support frame 101 and the adjacent end of the main frame 120, mechanism is provided to raise and lower transport wheel assembly 300 which includes outboard transport wheels 302A and inboard transport wheels 302B connected by a frame 301 to a rock shaft 106A which is parallel to and slightly forward (this is toward the draft vehicle and hitch 165) of the rock shaft 106 previously described as a wheel mount member 106 in the '581 patent. The rock shaft 106A like the rock shaft 106 is mounted to the support frame 101. The frame 301 (FIG. 17) which holds the transport wheels 302A and 302B includes a longitudinally extending frame member 303 extending from the rock shaft 106 and is connected at the other end to a yoke 305 having a center segment 306 generally parallel to the rock shaft 106A (FIG. 15) and outwardly extending leg segments 307 which are connected as by welding to an outwardly extending transverse segment 308. It should be understood that there are two intersections 306 of the yoke 305 and two leg segments 307 connected thereto and two transverse segments 308. Each of the transverse segments carries a strut 310 on which is rotatably mounted one each of the outboard and inboard transport wheels 302A, B on axles 304. Although four transport wheels 302A, B are shown, only two may be used in certain circumstances.

Figure 5:
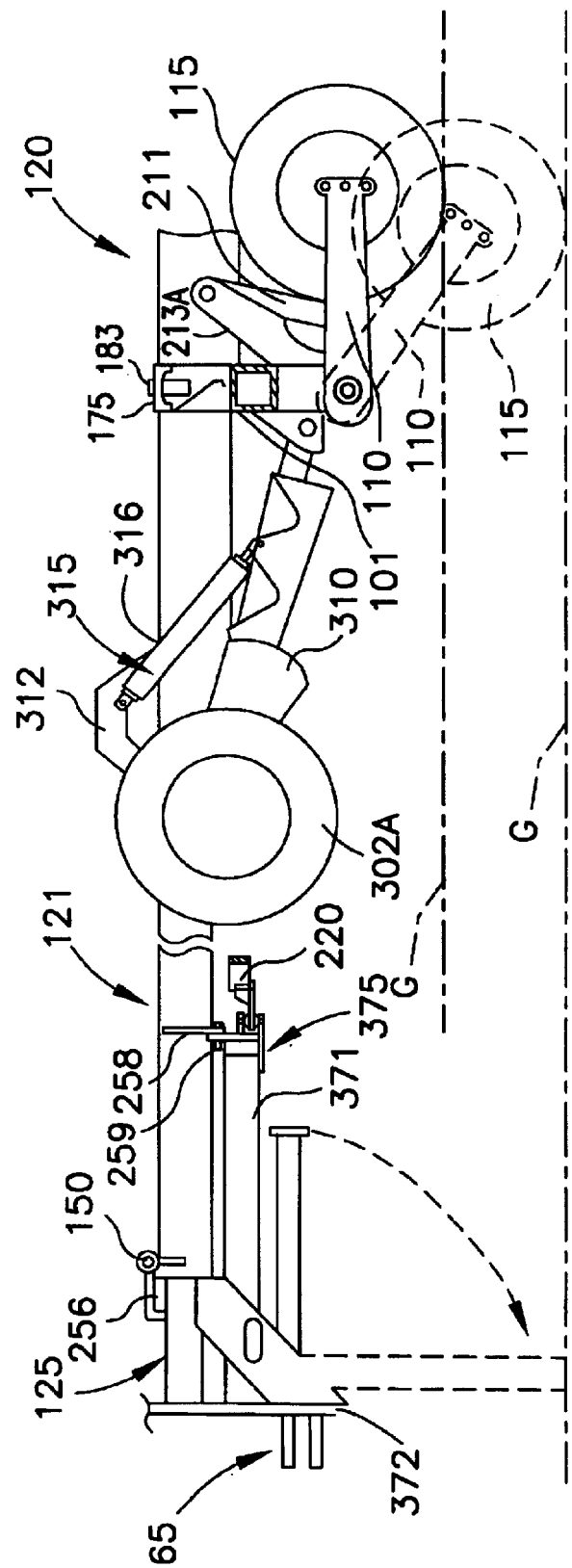
FIG. 5 is an enlarged fragmentary side elevational view of the device illustrated in FIG. 1.
Figure 7:
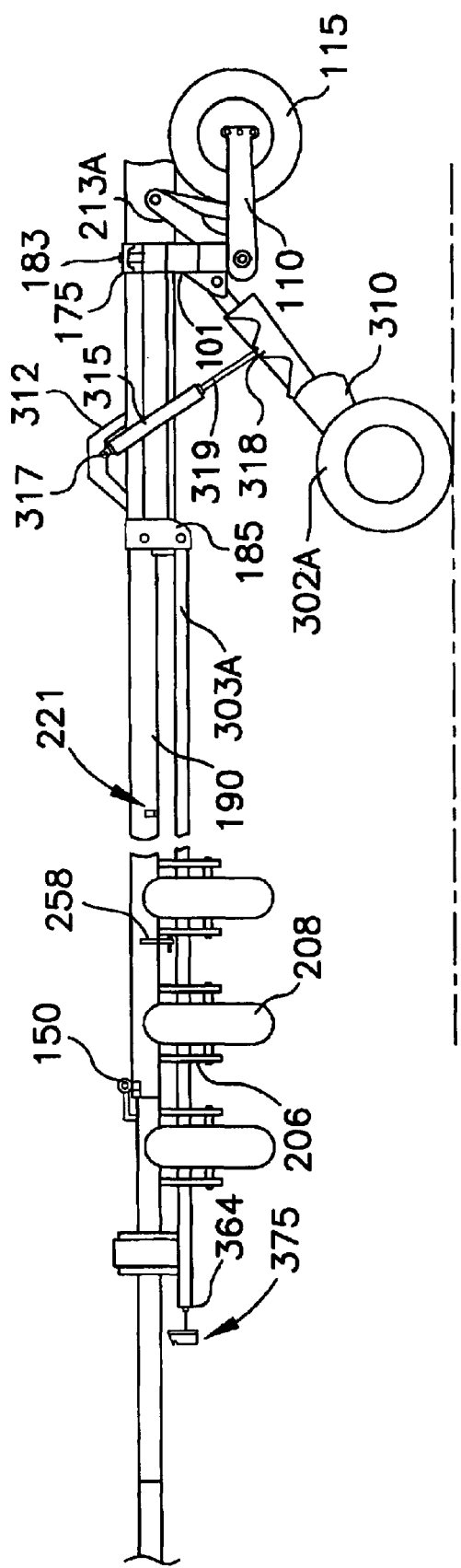
FIG. 7 is a side view of the device of FIG. 1 in the folded or transport positions.
Figure 11:
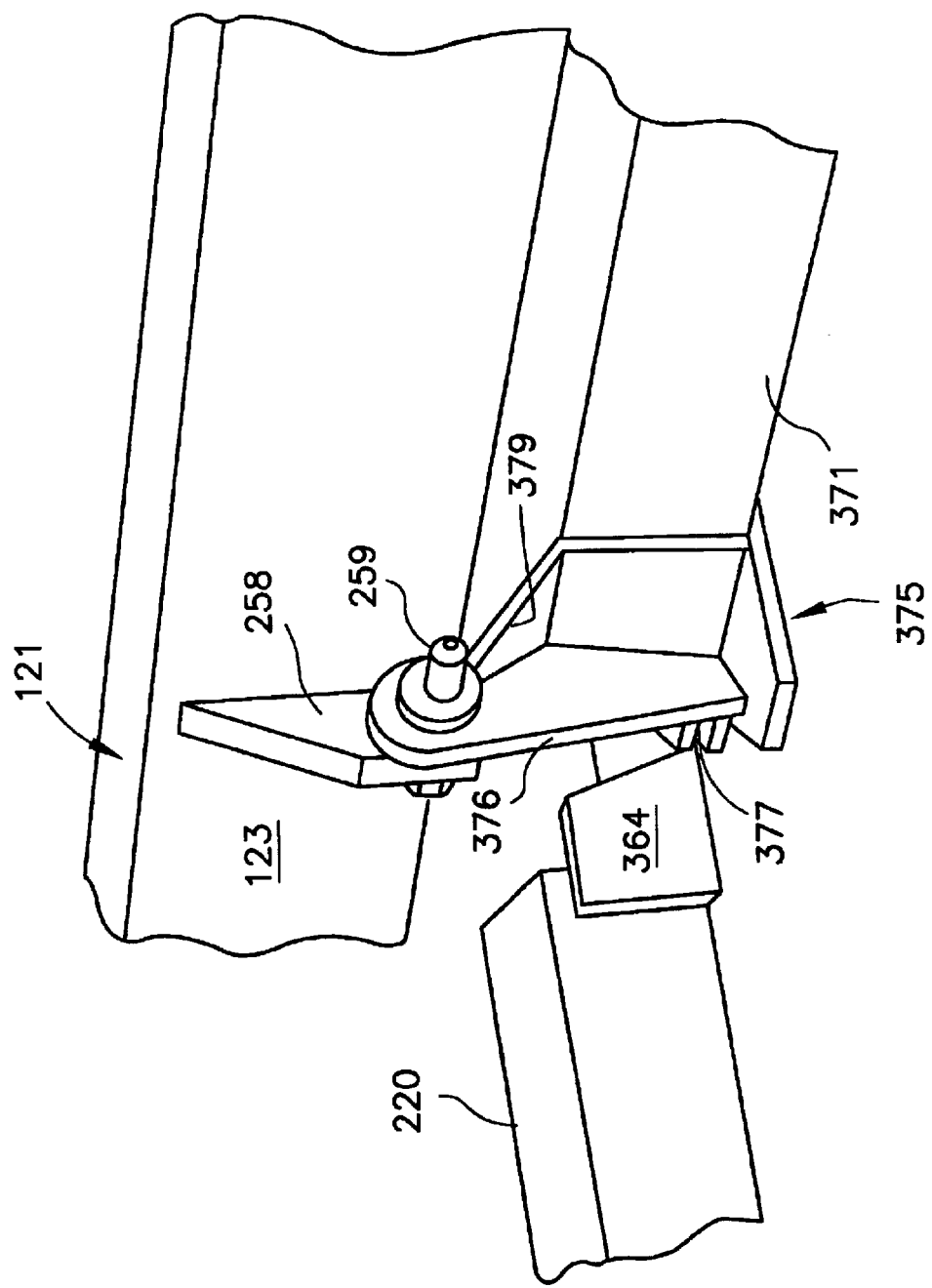
FIG. 11 is an enlarged view of the stabilizing lock mechanism illustrated in FIG. 8.
Figure 15:
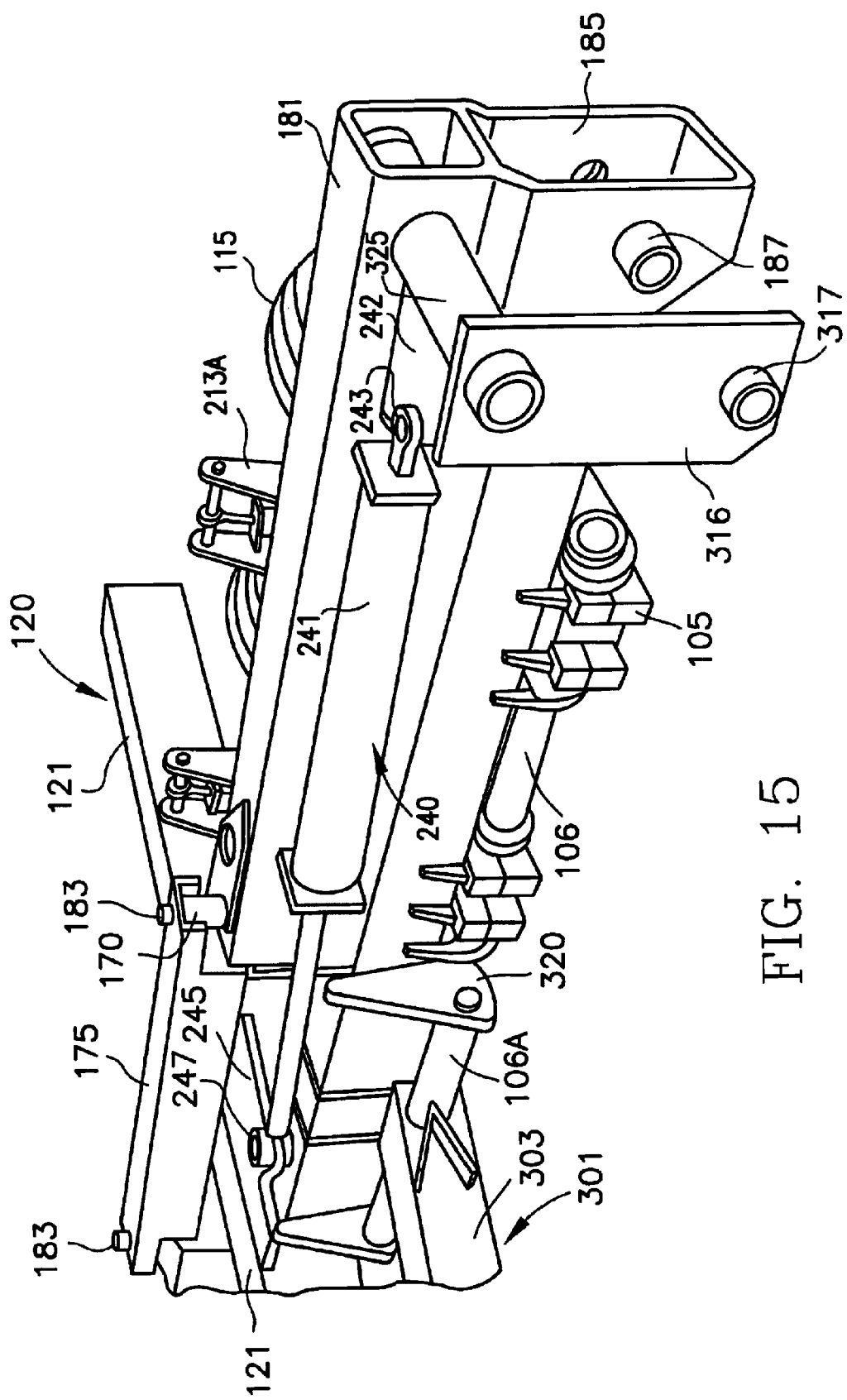
FIG. 15 is an enlarged perspective view showing the relationship of the support frame, wing motors, and wing hinge members.
Figure 17:
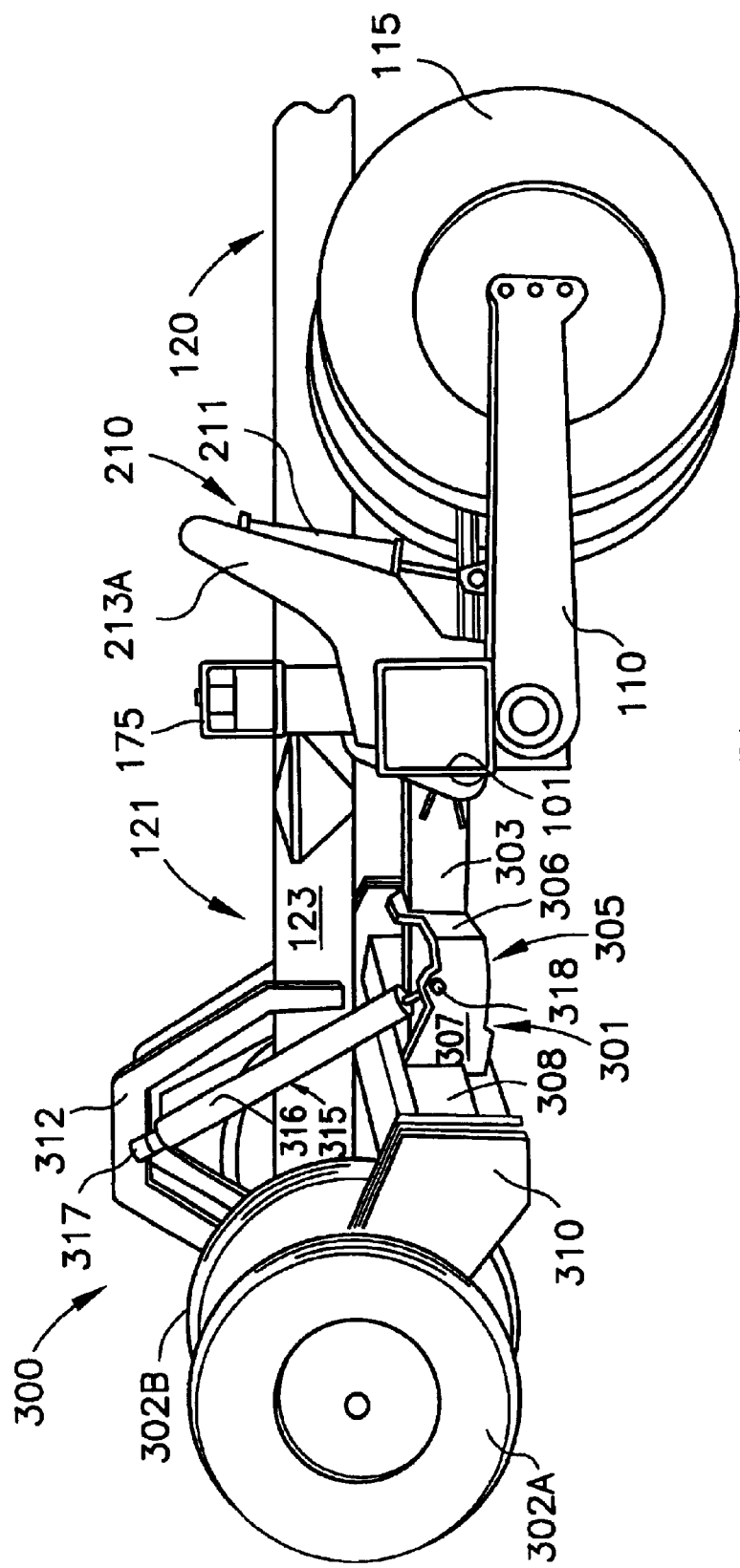
FIG. 17 is a partial side elevational view of the foldable implement frame with the transport wheels in the storage position and the center field wheels in a working position.

The two motor mechanisms 315 (FIGS. 5, 7 and 17) each of which raises and lowers one of each transport wheels 302A, B each includes a cylinder 316 which houses a piston, not shown, and which has a piston rod 319 extending therefrom in the usual manner. One end of each of the motors 315 is pivotally mounted as at 317 to a inverted U-shaped brace member 312 connected as by welding to the outer frame member 121 and more particularly, to the side walls 123 thereof. The other end of each of the piston rods 319 is connected by a connector 318 to the adjacent leg segment 307. Therefore, the transport wheels 302A, B are pivoted about the rock shaft 106A but mounted on axles 304 and moved between a storage position as shown in FIGS. 5 and 17 to a transport position in which the motor 315 is operated to extend the piston rod 319 so as to position the wheels 302A, B as shown in FIG. 7. The rock shaft 106A is mounted on a pair of spaced connectors 320 which are fixedly mounted, as by welding, to the support frame 101 (FIG. 15).

In order to facilitate the telescopic movement between the frame member 121 and the inner frame member 125 (which is mounted to a draft vehicle) roller and accompanying mechanism 150 as described in the '581 patent are utilized.

Figure 18:
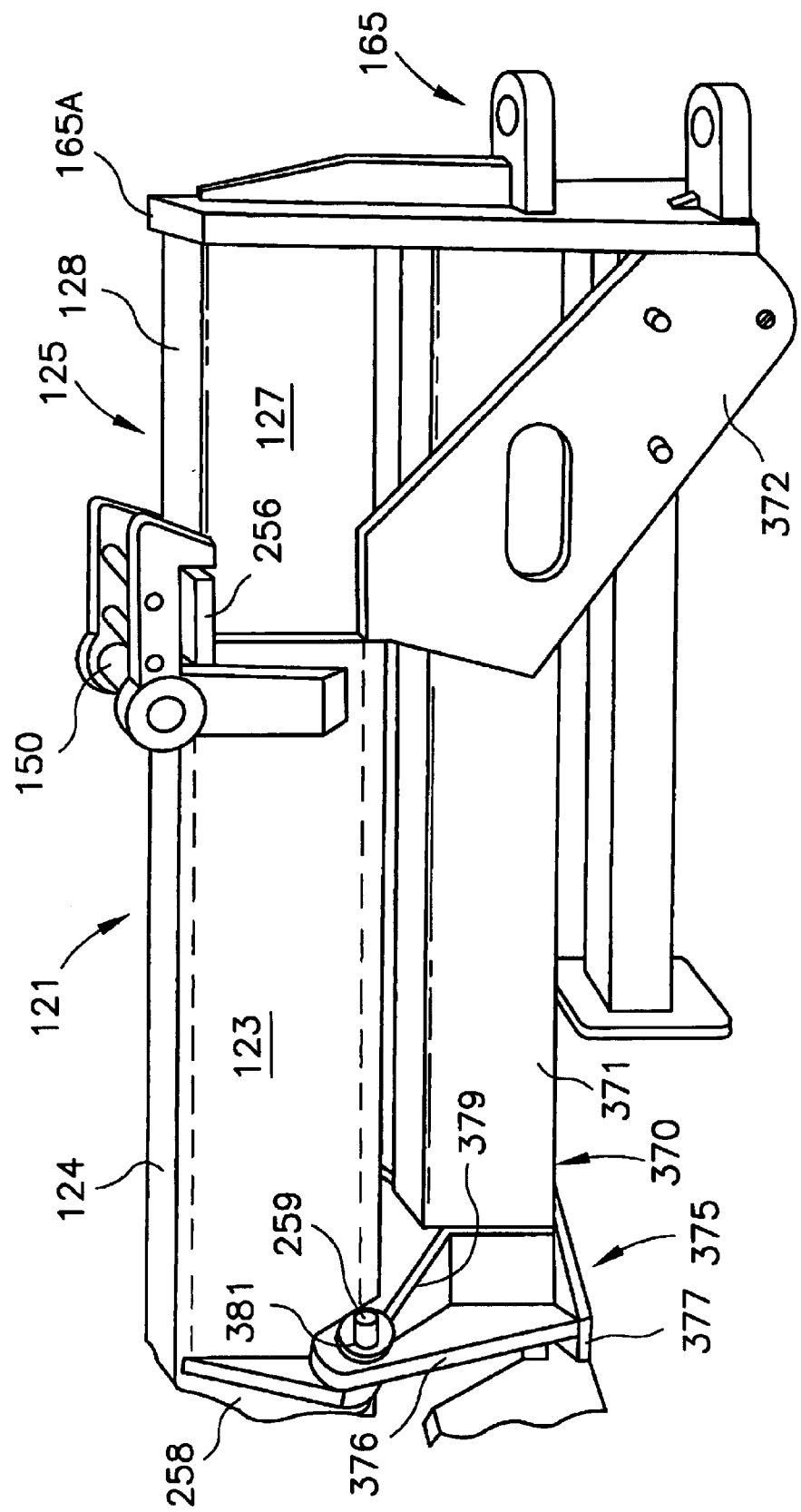
FIG. 18 is a partial side elevational view of the stabilizer lock assembly when the wing frames are in the extended working positions thereof.
Figure 19:
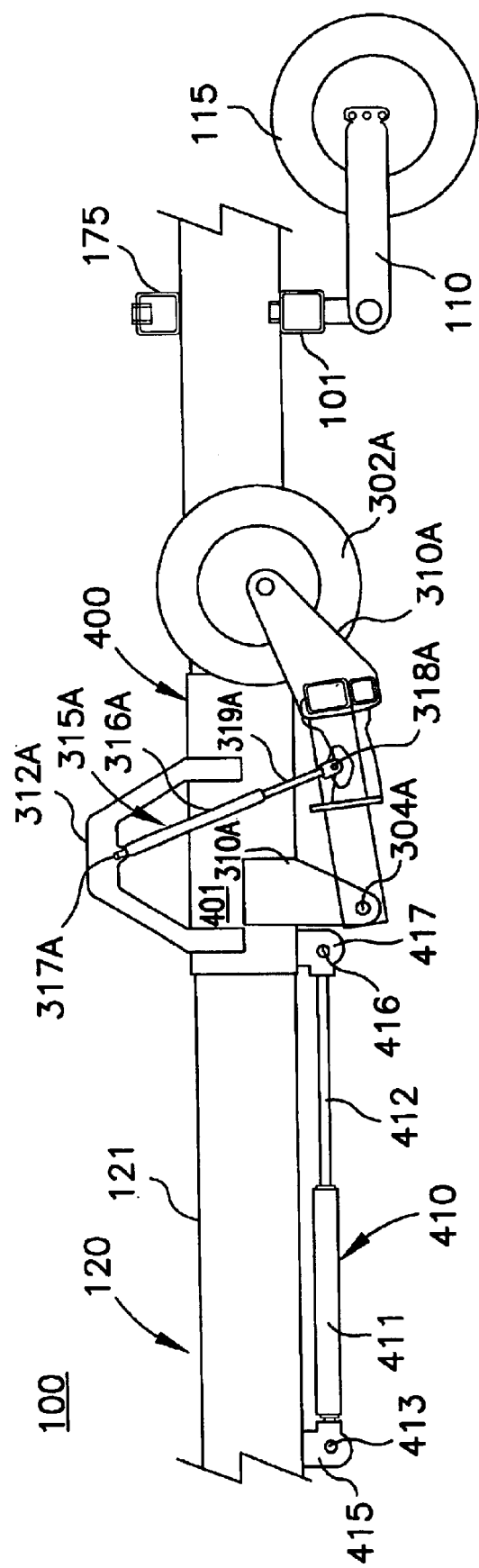
FIG. 19 is a partial side elevation view of the new planter showing the transport wheels mounted to a slidable collar in a raised position and the planter lift wheels in the planting position.

When the implement frame 100 is in the working position thereof illustrated in FIG. 1, the telescoping main frame members 121 and 125 are in the positions illustrated in FIG. 18. With the parts in this position, vertically aligned openings through the top and bottom walls of the outer frame member 121 are in alignment with openings in the top and bottom walls of the inner frame member 125, all as described in the '581 patent.

The other end of the inner frame member 125 is provided with a bifurcated hitch 165 having a vertically extending connecting plate 165A, the bifurcated portions being offset downwardly with respect to the main frame member 125 and secured to a three-point hitch of the associated tractor in the usual manner. This connection of the main frame member 120 to the hitch not only provides the necessary draft connection for the foldable implement frame and hitch 100, but also provides the connection so that the three-point hitch can be used to elevate the forward end of the implement frame 100, the rear end of the implement frame 100 and specifically the rear end of the main frame 120 being raised with respect to the ground by operation of the cylinders 315 described heretofore. It should be noted that the transport wheel assembly 300 and more particularly the wheels 302A, B have been moved forwardly along the frame 120 a considerable distance as compared to the position of the combination field wheel and lift wheels 115 in the '581 patent. By considerable distance, it is meant to be not less than about 36 inches from the support frame 101 to the axles 304 for holding the transport wheels 302A, B when the transport wheels are in the transport position, as will be described hereafter. The transport wheels 302A, B in the transport position thereof, may have the axles as much as about 60 inches or move forward of the support frame 101.

In the prior art, transport wheels would generally be positioned anywhere from 1–3 inches forward in the transport position as compared to the field position due to the additional extension of the piston rod which operates the motors that would move the field wheels from the field position to the transport position. When the word substantially is used in this context in this application, it is meant that the axles 3–4 of transport wheels 302A, B are not less than three feet and as much or more than five feet forward of the support frame 101 in the transport position thereof.

Figure 14:
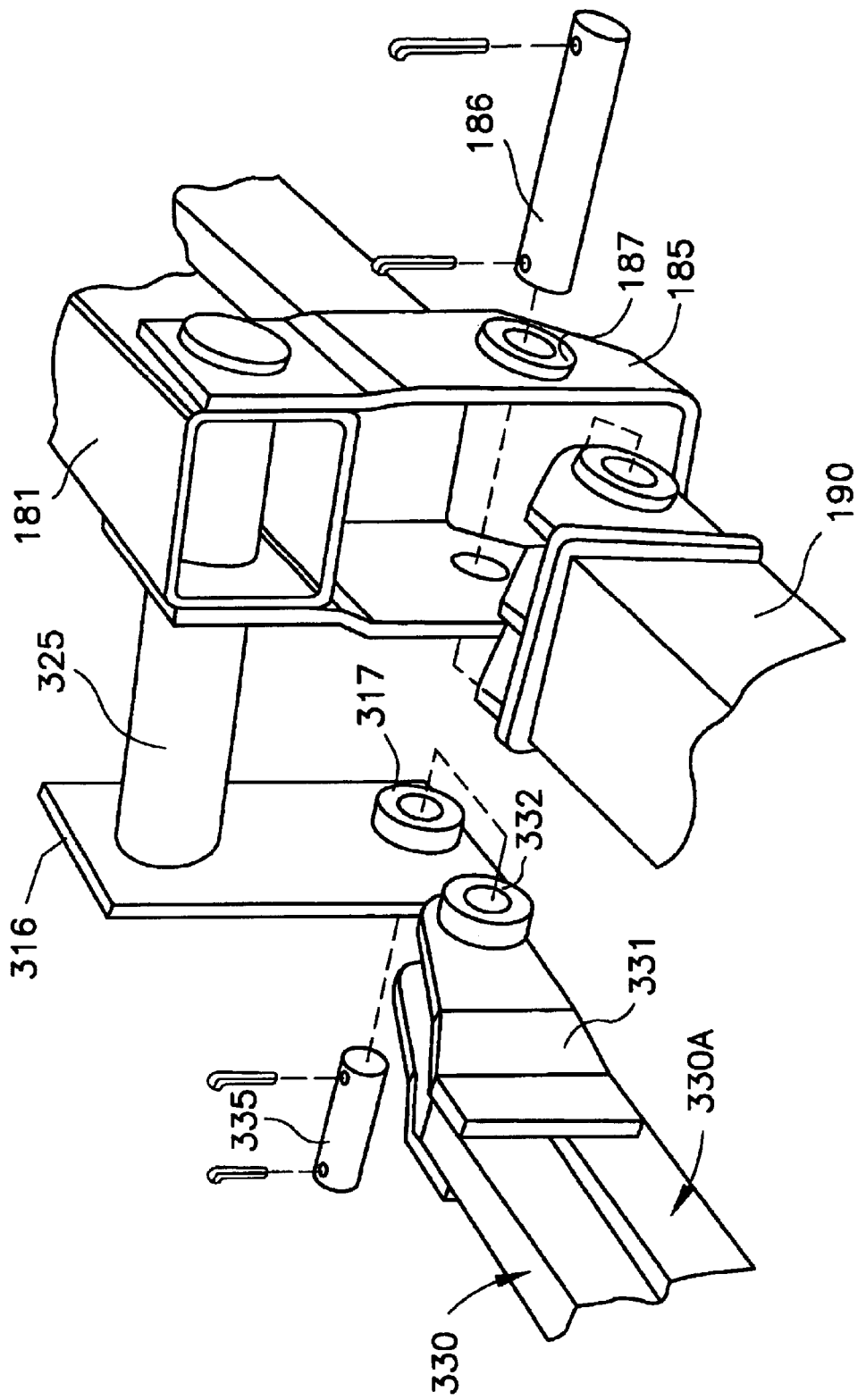
FIG. 14 is an enlarged perspective view of the pivoting mounting mechanism for the wing frames and stiffening members.

The wings 180 are pivotally secured to the support frame 101, and to this end, the support frame 101 carries two bearings 170 on the upper surface thereof spaced inwardly from the ends thereof. Each wing 180 includes a hinge member 181 that is secured to a hinge pin 183 extending upwardly from one of the bearings 170, each of the hinge members 181 being mounted for pivotal movement about a generally vertical axis. The outer end of each of the hinge members 181 carries a vertically oriented connector or strap 185 (FIGS. 14 and 15) which has pivotally secured between the lower ends thereof one end of the associated wing frames 190. A pivot pin 186 pivotally interconnects the vertical connector or strap 185 and the associated wing frame 190 so as to provide for pivotal movement of the wing frame 190 about a generally horizontal axis defined by the pivot pin 186 and is held in place by the usual cotter pins. The wing frames 190 are hollow and box shape in cross section and are movable between an extended working position illustrated in FIGS. 1 and 3 and a folded transport position illustrated in FIG. 6.

At the end of each member 181 is a shaft 325 extending perpendicularly from the hinge member 181. At the end of the shaft 325 away from the hinge member 181 is a vertically extending plate 316 similar to the bearing 187 in the vertical connector or strap 185. The bearing 317 receives one end of stiffening members 330 and 330A.

Figure 3:
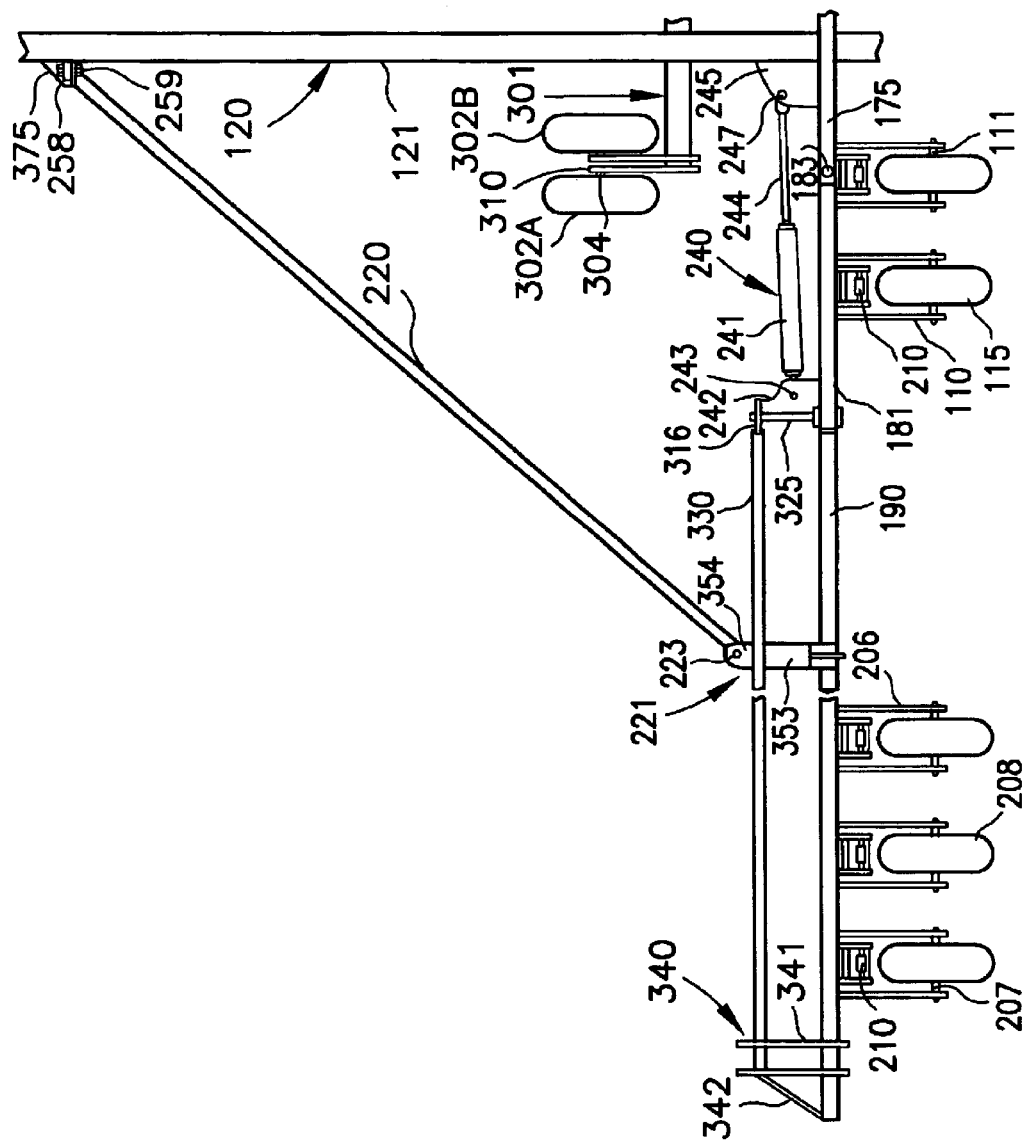
FIG. 3 is a partial top elevational view of the foldable implement frame and hitch of FIG. 1.
Figure 4:
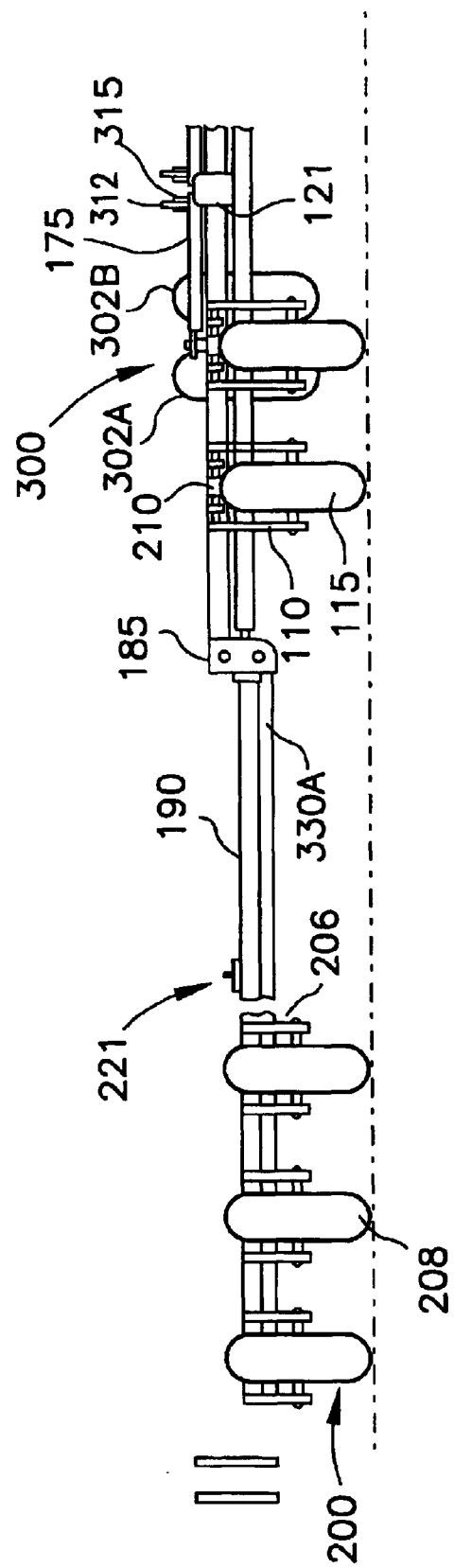
FIG. 4 is a partial rear elevational view of the device of FIG. 2.

The stiffening members 330 and 330A extend generally parallel to the wing frame 190 and has a bifurcated mounting plate 331 at one end thereof, each of the bifurcated mounting plates 331 carrying a bearing member 332 at the end thereof through which a pin 335 pivotally mounts the stiffening members 330 and 330A to the vertical plate 316. Cotter pins retain the pivot pin 335 in place. The stiffening members 330 and 330A are connected to the associated wing frame 190 at the other end thereof by a brace construction 340 (FIG. 3). More particularly, the connection between the stiffening members 330 and 330A and the associated wing frame member 190 includes a spaced apart pair of parallel connecting struts 341 normal to the frame member 190 and stiffening members 330A, B and a angular strut 342 which connects the end of the wing frame 190 to the end of the stiffening members 330 and 330A which terminates short of the distal end of the wing frame 190.

Because of the substantial length of each of the wing frames 190, the outer end thereof is supported by a wing wheel assembly 200 (see particularly FIGS. 1 and 3). Each of the wing wheel assemblies 200 includes a bracket (not shown) mounted on the associated wing frame member 190 and fixedly secured thereto as by welding, the brackets being previously described in the '581 patent. A pivot (not shown) is as described in the '581 patent and each supports pairs of struts 206 that each carry an axle 207 upon which is rotatably mounted a wheel 208. The wheels 208 support the outer ends of the associated wing frames 190 during the movement of the folding wings 180 between the working positions thereof and the transport positions thereof and also whenever it is desired to lift the implements carried by the implement frame 100 out of contact with the underlying soil.

In order to move the wheels 208 between the transport positions and the working positions, wheel lift motors 210 have been provided. Each of the motors 210 is the same as the motors 210 previously described in moving the center field wheels 115 and includes a cylinder 211 provided with a piston (not shown) connected to a piston rod 212 that extends out of one end of the cylinder 211. The other end of the piston rod 212 carries a connector (not shown) that is secured to the wing frame 190, and the hydraulic cylinder 211 is pivotally secured by a pivot pin (not shown) to two lever arms (not shown) disposed on the opposite sides of the cylinder 211, all as described in the '581 patent.

To assist in holding the folding wings 180 in the fully extended and working positions illustrated in FIGS. 1 and 3 each of the folding wings 180 has been provided with a wing brace generally designated by the numeral 220. One end of each of the wing braces 220 is pivotally secured by a pivot pin 223 to a bracket 221 which includes two spaced apart members 351, each having an attachment portion 352 connected as by welding to each wing frame 190, one on the top wall and one on the bottom wall, and a downwardly extending portion 353 and a horizontal portion 354, each having an aperture 355 therein for receiving the pivot pin 223. A brace member 357 connects portions 353 and strengthens the brackets 221. Because of the portions 353, the horizontal portions 354 extend between and beneath the stiffening members 330 and 330A by means of a pivot pin 223, each bracket 221 being fixedly secured to one of the wing frames 190 at a position such that the effective pivot connection between the wing brace 220 and the wing frame 190 is essentially at the midpoint of the wing frame 190 (i.e., the point of intersection of an extension of the wing brace 220 with the wing frame 190 as viewed in FIG. 1). The other end of each of the wing braces 220 is pivotally secured by a ball joint 360 to a new stabilizer lock assembly 370 to be described more fully hereinafter.

Figure 6:
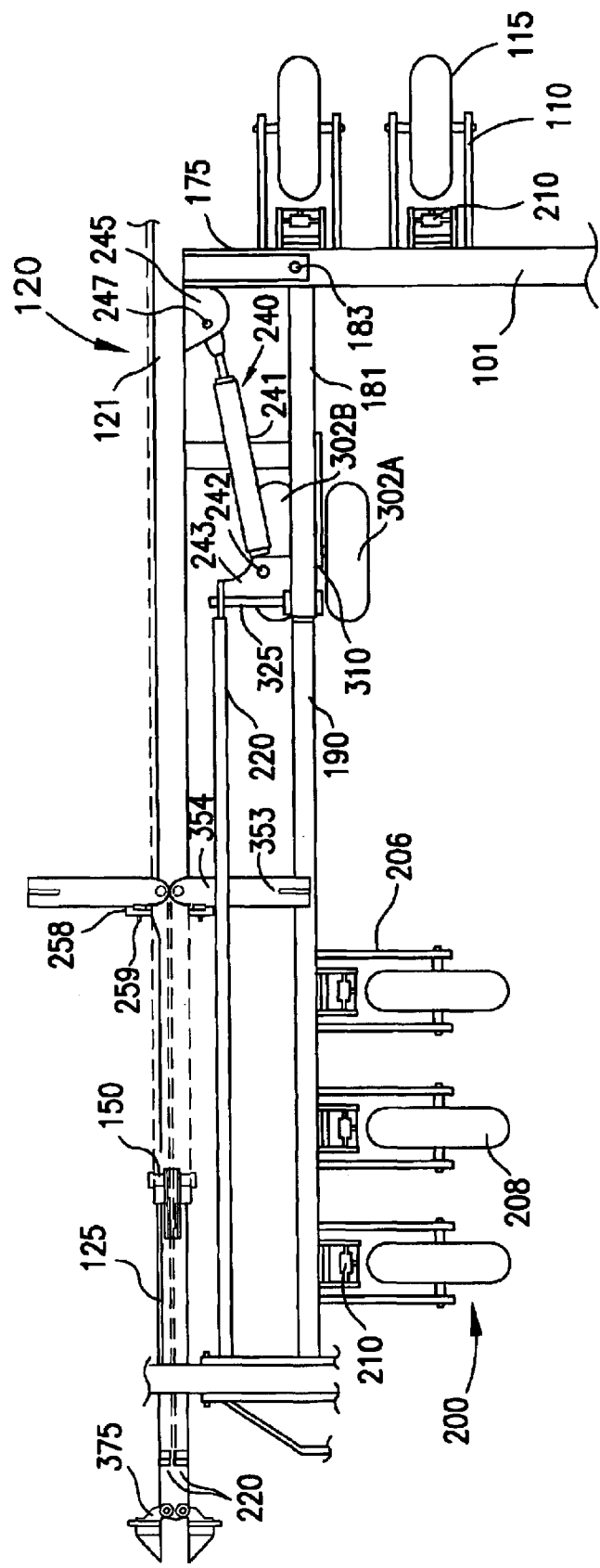
FIG. 6 is a partial top plan view of the foldable implement frame and hitch made in accordance with and embodying the principles of the present invention, the parts being shown in the folded transport positions.

During the transport of the implement frame 100 with the parts in the position illustrated in FIGS. 5 and 6, the transport wheels assembly 300 are in the position of FIG. 7, which serves to hold the support frame 101 and the adjacent end of the main frame 120 in the elevated positions necessary for transport, preferably about 5 feet above the ground. The complicated lever, latch and cable assembly of the '581 patent is no longer required because the transport wheel assembly 300 moves between its stored position in FIG. 5 and the transport position in FIG. 7 by operation of hydraulic motors 315 both of which are on hydraulic lines separate from the hydraulic lines which control center field wheels 115 and wing field wheels 208, all of which are operated by similar hydraulic motors 210.

By providing, dedicated transport wheel assembly 300, several advantages are obtained. The center of gravity of the implement frame 100 can be adjusted forward toward the draft vehicle between about 3' and about 5' during transport as compared to the center of gravity when the field wheels 115 support the implement 100, which permits the apparatus behind the center of gravity (in the transport position) to be heavier and/or larger. This permits implement frames 100 being able to accommodate 32 or 36 row units, while at the same time moving the transport wheels 302A, B inboard with respect to the '581 machine. The new transport wheels 302A, B are preferably 84" apart, center to center, of the outboard pair of wheels 302A and preferably about 52" apart, center to center, of the inboard pair of wheels 302B. This is only representative and preferred, but does not limit the invention. Clearly, the outboard pair of wheels 302A may be somewhat closer or farther apart and that is also true for the inboard pair of transport wheels 302B. However, an advantage is that all four transport wheels 302A, B are on pavement, as opposed to the '581 machine, as previously described. Moreover, only two transport wheels may be used instead of the illustrated four without departing from the invention.

Yet another advantage in having dedicated transport assembly 300 is the transport wheels hydraulic motors 315 can move the transport wheels 302A, B downward a sufficient extent (about 5 feet) to elevate the implement frame 100 higher above the ground in the transport position (FIG. 7) than previously available with the '581 device. Further, the center field wheels 115 can be moved a shorter distance at the end of a row when the implement frame 100 is turned (see dotted line position of FIG. 5), thereby elevating the implement frame 100 to disengage any ground engaging implements carried by the implement frame 100, which saves the farmer time. All these advantages are a result of the dedicated transport wheel assembly 300.

Figure 16:
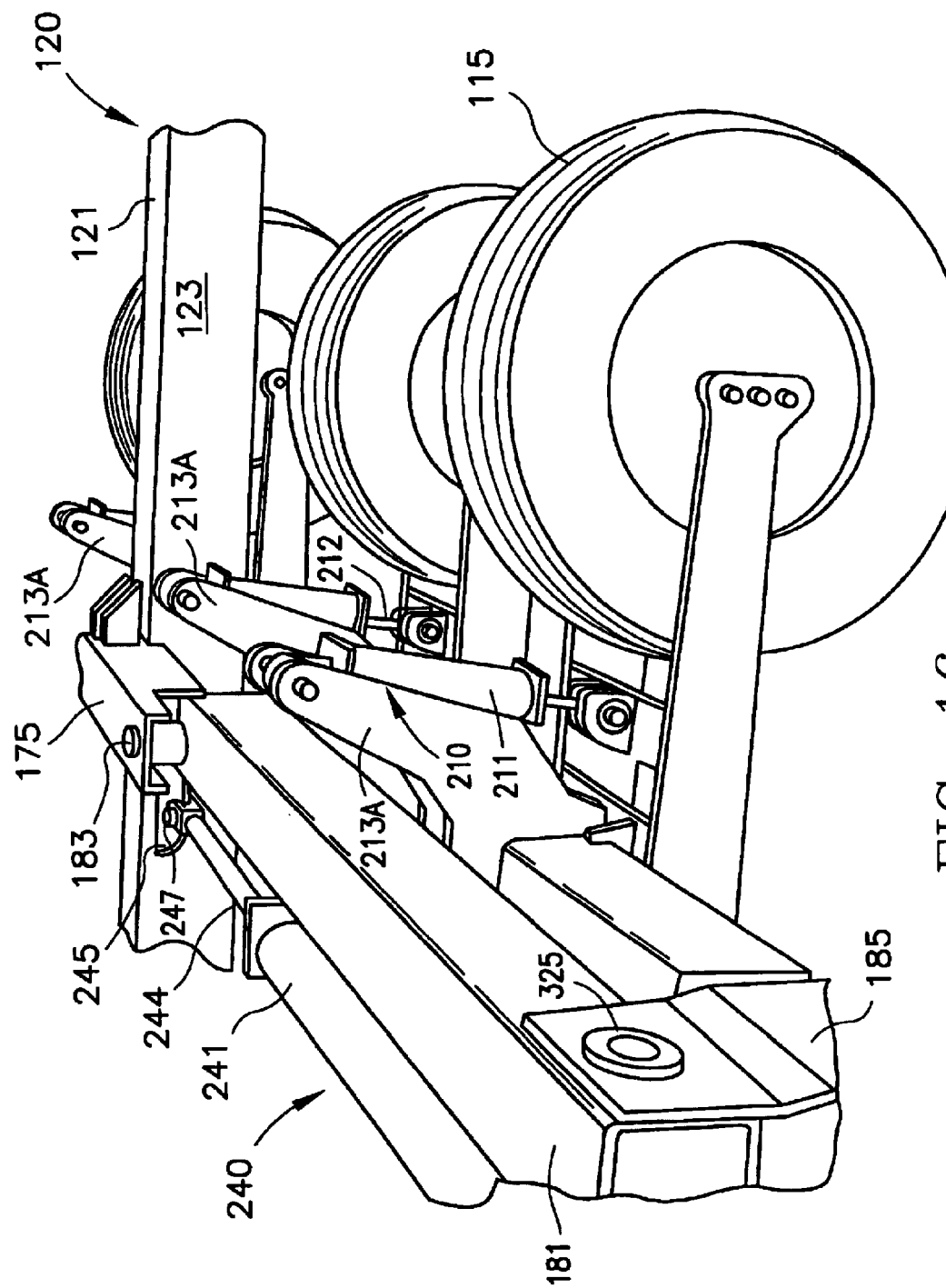
FIG. 16 is an enlarged perspective view showing the relationship of the support frame, center field wheels and wing hinge members.

In order to assist in moving the folded wings 180 between the retracted travel positions illustrated in FIG. 6 and the extended working positions illustrated in FIG. two wing folding motors 240 have been provided (FIGS. 6, 15 and 16). Each of the motors 240 includes the usual hydraulic cylinder 241 having a piston (not shown) disposed therein and connected to a piston rod 244 extending from one end of the cylinder 241. One end of each of the cylinders 241 is connected to a coupling 242 connected to the associated hinge member 181 by a pin 243. The piston rods 244 are respectively connected to brackets 245 which are mounted on both the outer frame 121 and the cross member 175 by means of pins 247. Contraction of the motors 240 assists in moving the folding wings 180 from the extended working positions of FIG. 1 toward the folded positions of FIG. 6.

When the main frame members 121 and 125 are in the fully telescoped and working positions thereof, it is desired to stabilize the same and to provide for transmission of draft forces there between through structure in addition to the lock pin (not shown) but described in the '581 patent To this end the stabilizer lock assembly 370 has been provided and is best illustrated in FIGS. 8–11 and 18. The stabilizer lock assembly 370 includes a tubular bottom frame member 371 fixedly secured as by welding to the side walls 127 of the frame member 125 and to the vertically extending plate 165A of hitch 165 by a pair of angularly disposed plates 372.

The assembly 370 further includes a butterfly or yoke member 375 fixedly mounted as by welding to the rearmost end of the bottom frame member 371. The butterfly or yoke member 375 includes two upwardly extending and spaced apart vertical plates 376 connected at the bottom thereof to outwardly extending brackets 377 each provided with two apertures 378 near the ends thereof for receiving the ball joints 360, thereby mounting the struts 220 to the frame member 371. The yoke member 375 further includes upwardly and outwardly extending arms 379 each provided with apertures 381 therein for a purpose hereinafter set forth.

The outer telescoping frame member 121 is as previously shown in the '581 machine provided with a generally U-shaped member 258 from which extends on both either side of the outer member 121 and more particularly the walls 123 thereof, pins 259. When the implement 100 is in the working positions thereof with the frame members 121, 125 in the fully telescoped operated positions as illustrated in FIG. 1, the pins 259 enter into the recess apertures 381 to provide vertical and lateral stability for the juncture while the forward end of the frame member 121 passes over the bottom frame member 371, between the arms 379 of yoke 375. A cross bar 256 on top wall 128 of frame member 125 serves to provide a stop for outer frame member 121 and cooperates with a latch connected to the roller 150 to secure the implement 100 in the operating positions thereof. The presence of the pins 259 in the openings 381 relieves stress in the wing frames 190. The lefthand and right hand wing frames 190 do not tend to move in opposition to each other, but in unison creating stress, which is transferred by the braces 220 to the bottom frame member 371 and the hitch 165.

When the implement frame 100 is in the folded transport position illustrated in FIG. 6, it is desirable to lock the wings 180 on the main frame 120, this structure (not shown) is the same as previously described in the '581 patent.

The hydraulic assembly used to operate the present invention is similar to the hydraulic system disclosed in the '581 patent. In the present invention, the center field wheels 115 are operated by hydraulic motors 210 which may be substantially the same as the hydraulic motors 210 which operate the wheel assemblies 200 on the folding wings 180. In the '581 machine, the hydraulic system connected to the center field wheels 115 was used to activate the field wheels 115 into the transport position. Obviously, in the present case, with dedicated transport mechanism 300 being provided, a separate hydraulic line or lines are dedicated to the transport wheel assembly 300. Moreover, because there is a separate hydraulic line for the transport wheel assembly 300, the transport wheels 300 can move a longer vertical extent than the field wheels 115 and 208. This, as previously discussed, provides a significant advantage of time saving in the field when the farmer has to elevate the implement frame and hitch 100 in order to turn at the end of the rows. This is so because in the '581 machine, the center field wheels, when operated to elevate the frame, would go to the transport position which is higher than is necessary to turn the implement frame 100 at the end of a row. In the present invention, all or a portion of the field wheels 115 (center) and 208 (wings) and the hydraulic motors 210 which are connected thereto may elevate the frame 100 a sufficient amount (FIG. 5 dotted line) such that any farm implements carried by the frame 100 clears the ground thereby allowing the implement 100 to turn more easily but at the same time do not elevate the frame 100 to the distance above the ground which is provided when the transport wheel assemblies 300 are activated for transport of the foldable implement frame and hitch 100.

The manner of use and operation of the implement frame 100 will now be described in detail. Starting with the parts in the fully retracted and folded position of FIGS. 6 and 7 which is the transport position for the implement frame 100, the various parts will be disposed as follows: the three-point hitch will be raised, thus raising the main frame member 125 and the parts associated therewith so as to provide ground clearance. The wings 180 are in the fully folded position whereby the wing frames 190 are disposed essentially parallel and forwardly extending and the stiffening members 330 and 330A are between the main frame 120 and the adjacent wing frame member 190. The wing braces 220 are beneath the main frame 120 and occupy substantially the same width. That is the wing braces 220 do not extend much, if any, beyond the width of the main frame 120. This is extremely important since it permits various units to be mounted on the stiffening members 330, 330A between the wing frame members 190 and the main frame 120, a significant advantage over the '581 machine.

Referring now to FIG. 7, there is illustrated the transport wheel assembly 300 in the transport position thereof during which the hydraulic motors 315 have the piston rods 319 fully extended thereby elevating the main frame 120 to its highest position above the ground, such as about 5 feet, and in position for transport. The vertical distance between the main frame 120 and the axles 304 of the transport wheels 302A and 302B can be adjusted by a variety of ways including varying the hydraulic motors 315, as is well known in the art. The axles 304 about which the transport wheels 302A and 302B rotate are positioned forward of the support frame 101 preferably between about 3 and about 5 feet and most preferably about 62 inches. As before described, this moves the center of gravity of the folding implement frame 100 forward toward the draft vehicle when the implement frame 100 is in the folded or transport position. Also, hydraulic motors 210 which operate field wheels 115 and 208 may be configured so that the distance between the field position in which implements carried by the end frames 190 and/or the stiffening members 330 and 330A are in contact with the ground and the distance which the frame 120 has to be elevated in order to disengage those units from the ground (see FIG. 5) for turning the foldable implement frame and hitch at the end of a row can be shorter to save time at the end of each row, compared to the machine described in the '581 patent.

In order to move the parts of the implement frame 100 from the positions illustrated in FIGS. 6 and 7 to those illustrated in FIGS. 1 and 3, the three-point hitch is lowered so as to rest the wing frames 190 upon the wheels 208 and to lower the main frame member 125 out of contact with and spaced below the transport link as disclosed in the '581 patent. The operator then drives the associated tractor slowly rearwardly. The support frame 101 on the wheels 115 remains essentially stationary while the motors 240 are actuated. This action transmits a force to the wing braces 220 that tends to move the wing frames 190 apart and away from each other toward the positions illustrated in FIG. 1. The hydraulic motors 240 are also extended at this time by actuating the appropriate control valve, (not shown) thus to aid in this rearward swinging of the wing frames 190.

The parts eventually arrive at the positions illustrated in FIG. 1, i.e., with the wing frames 190 in lateral alignment, the hydraulic motors 240 fully extended and the main frame members 121 and 125 fully telescoped and with the latch over the bar 256 (FIG. 18). The operator can remain in his seat on the tractor since there are no locking pins used in the '581 patent. The latch assembly (FIG. 18) assists in holding the main frame members 121 and 125 in the fully telescoped and coupled position illustrated in FIG. 1. It will also be noted that as the main frame members 121 and 125 approach the fully telescoped positions thereof, the pins 259 enter the openings 381 in the yoke 375 (see FIGS. 8–11 and 18) to impart rigidity to the main frame at this juncture.

The operator then without leaving his seat on the tractor, simultaneously actuates hydraulic motors 315 to the retracted positions so as to lower the support frame 101 and the rear end of the main frame 120 from the position of FIG. 7 to the working positions thereof shown in FIG. 5. The hydraulic motors 315 and the hydraulic motors 210 are connected to different hydraulic circuits, whereby actuation of the motors 315 to lower the support frame 101 and the main frame 120 is independent of the motors 210 which raise or lower the wheels 115, 208 to the working positions thereof. Moreover, at the end of a row, the motors 210 can be actuated to raise the frame 120 FIG. 5) without raising the frame 100 to the extent shown in the transport position of FIG. 7.

Certain implements carried by the implement frame 100 further include clutch arrangements which are also actuated by the shifting of the wheels 115 and/or 208, whereby placing the wheels 115 and/or 208 in the working position engages the implement clutches, while movement of the wheels 115 and/or 208 to the transport position disengages the implement clutches. The implement frame and the implements thereon are now in the position for working and the associated tractor moves forwardly pulling the implement frame 100 behind.

When it is desired to transport the implement frame 100, it can be moved from the working position illustrated in FIG. 1 to the transport position illustrated in FIG. 6 as follows: the operator gets down from the seat of the associated tractor and disengage the latch carried by roller 150. He then remounts the tractor and actuates control valves to expand the hydraulic motors 315 to raise the support frame 101 and the frame member 121 to the positions of FIG. 7 while lowering transport wheels 302A, B. Pilot operated check valves are used with motors 315 to prevent the frame 100 from dropping from the transport position if hydraulic fluid is lost. The operator then starts the tractor forward at a slow rate while simultaneously operating the wing folding motors 240 to retract the same. The inner frame member 125 moves forwardly with the tractor. In FIG. 1, the braces 220 are connected to the lower frame member 371 and the inner frame member 125 to extend inner member 125, which in combination with the retraction of motors 240, pull the wings 180 forward. The three point hitch on the tractor is raised to engage the latch (160) as shown in the '581 patent. The outer ends of the wing frames 190 are supported by the wheels 208 which are raised by the motors 210 whereby the parts move to the position of FIG. 6. to move to the planting position, the above process is reversed As the outer ends of the wings 180, and specifically the wing frames 190, approach each other, the wing braces 220 fold underneath the main frame 120 freeing up space between the wing frames 190 and the main frame 120 for units mounted on the stiffening members 330 and/or 330A. The stiffening members 330 and 330A prevent the wing frames 190 from cracking or bending because of forces generated during operation of the device.

A large number of implements may be advantageously mounted upon the implement frame 100 described. Because of the stiffening members 330 and 330A, in combination with other features and advantages described herein, 32 or 36 row or larger planters may be used. Other examples of tools that may be mounted upon the frames 100 are rotary hoes and "duck-foot" field cultivators. When folded to the transport position of FIG. 6, the implement frame 100 described above has a transport width of less than 11 feet with no implements mounted thereon and has a transport width of less than 15 feet when there are mounted thereon air-injection plate lift planters 60 as illustrated in the drawings. The center of gravity having been moved forward as previously discussed and the dedicated transport wheels 302A and 302B permit a shorter turning radius for the subject device compared to the '581 device and the implement frame 100 can carry more weight with a larger number of units because of the new center of gravity does not lift the front of the draft vehicle.

It is believed that all the advantages of the '581 machine have been retained but significantly improved by the addition of dedicated transport wheels closer together than the '581 transport wheels, and the relocation of the center of gravity toward the draft vehicle, and the addition of stiffening members 330 and 330A with the newly configured brackets 221 permitting the wing braces 220 to fit underneath the main frame 120 (see FIG. 6) freeing space for additional units mounted on the stiffening members forward of the wing frames 190.

Referring to new FIGS. 19 to 28, an improvement in the '950 devices is shown in which the wings 180 are now approximately 50% longer for 32 to over 40 row unit planters, and a new flex point for each wing has been added, and the transport wheels are pivotally mounted on a sliding collar with the pivot forward of the transport wheels for larger planters of 32 rows and more, whereas the 24 row planter has the pivot behind the wheels. Numbers used herein with reference to FIGS. 19 to 29 have been defined in FIGS. 1–18 of the parent application.

Referring now to drawings 19–29, there is illustrated the improvement on the parent planter set forth in the above-mentioned U.S. Pat. No. 6,408,950 which was an improvement on the planter illustrated in U.S. Pat. No. 4,364,581, now expired. Where possible, like parts have been numbered with corresponding numbers as those used in the '581 or the '950 patent. A principal difference between the present application and that of its parent and '581 patent is in the mounting of the transport wheels 302A, B on a sleeve assembly 400 adapted to ride on the outer telescoping frame member 121 so as to permit longitudinal movement of the sleeve assembly 400 and hence the transport wheel assemblies 300A longitudinally of the planter 100 in order to substantially change the center of gravity of the folded planter in the transport position thereof to permit infinite adjustment of the planter center of gravity in order to prevent the front wheels of the draft vehicle from being lifted from the ground. Because the planter 100 of the present invention may be used with a large number of row units, there is frequently the case where the planter in the folded position becomes back heavy and the mechanism of the present invention as hereinafter described significantly alleviates the problem, thereby preventing a potentially dangerous condition.

Another important feature of the present invention compared to that disclosed in the parent '950 patent is in the use of multiple pivots for the wing structures 180 in order to permit fragmented portions of the wing structures to move vertically in the field, that is around a horizontal pivot point in order to accommodate for contour differences in the land when using large multiple row planter systems.

As seen in the drawings, the transport wheel assemblies 300A are mounted as previously described except for the following: a sleeve assembly 400 is provided, which is slidable with respect to the outer tubular frame member 121 and includes a generally parallel side walls 401 interconnected by a top wall 402 and a bottom 403. The frame assembly 312a and associated mechanism is mounted to the sleeve assembly 400, thereby providing for longitudinal movement of the entire transport wheel assemblies 300A with the sleeve assembly 400. More particularly, as previously described, there are preferably, two sets of two transport wheels 302A and 302B on each side of the folded frame assembly as seen in the drawings in FIGS. 19–29 inclusive. The transport wheels 302A, B are mounted to a pivot 318a. Another important feature of the present invention as compared to the parent patent is that the pivot point 304a for the transport wheels 302A, B is always forward of the transport wheels 302A, B, whether the wheels are in their transport position as shown in FIG. 22 or in their fully folded working position, as shown in FIG. 20.

The sleeve assembly 400 is connected to hydraulic motor 410 having the usual hydraulic cylinder 411 having a piston (not shown) disposed therein and connected to a piston rod 412 extending from one end of the cylinder 411. One end of the cylinder 411 is pivotally connected to a coupling 417 as at 416 which is mounted to the outer sleeve 121 and the other end of the piston rod 412 is pivotally mounted as at 413 to a coupling 415 mounted to the bottom 403 of the sleeve assembly 400. Accordingly, the sleeve assembly 400 is longitudinally movable along the outer frame member 121 as herein described and illustrated in the drawings between the position as shown in FIGS. 20 and 21 and the position shown in FIG. 22, and is infinitely adjustable between the two positions.

Figure 20:
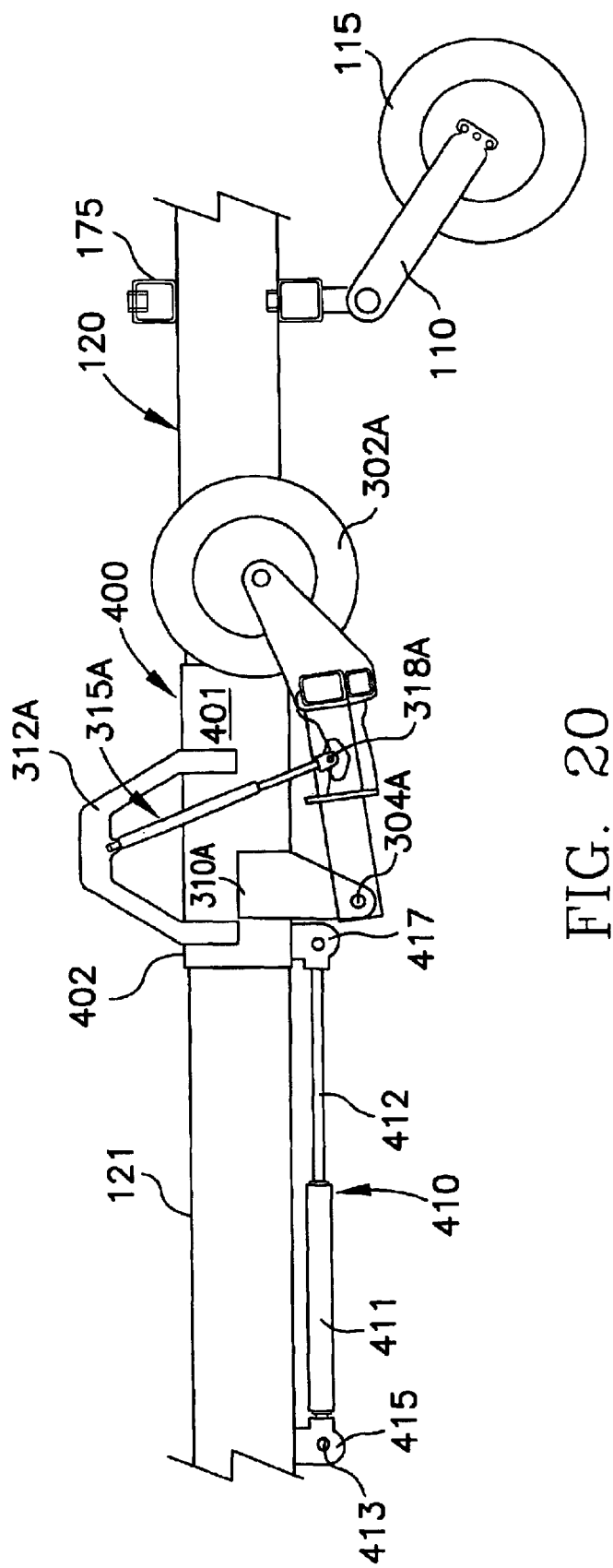
FIG. 20 is a partial side elevational view showing the new planter with the transport wheels mounted on a slidable collar with the transport wheels elevated and to the rear and the planter lift wheels further extended to facilitate turning the planter at the end of the field.
Figure 21:
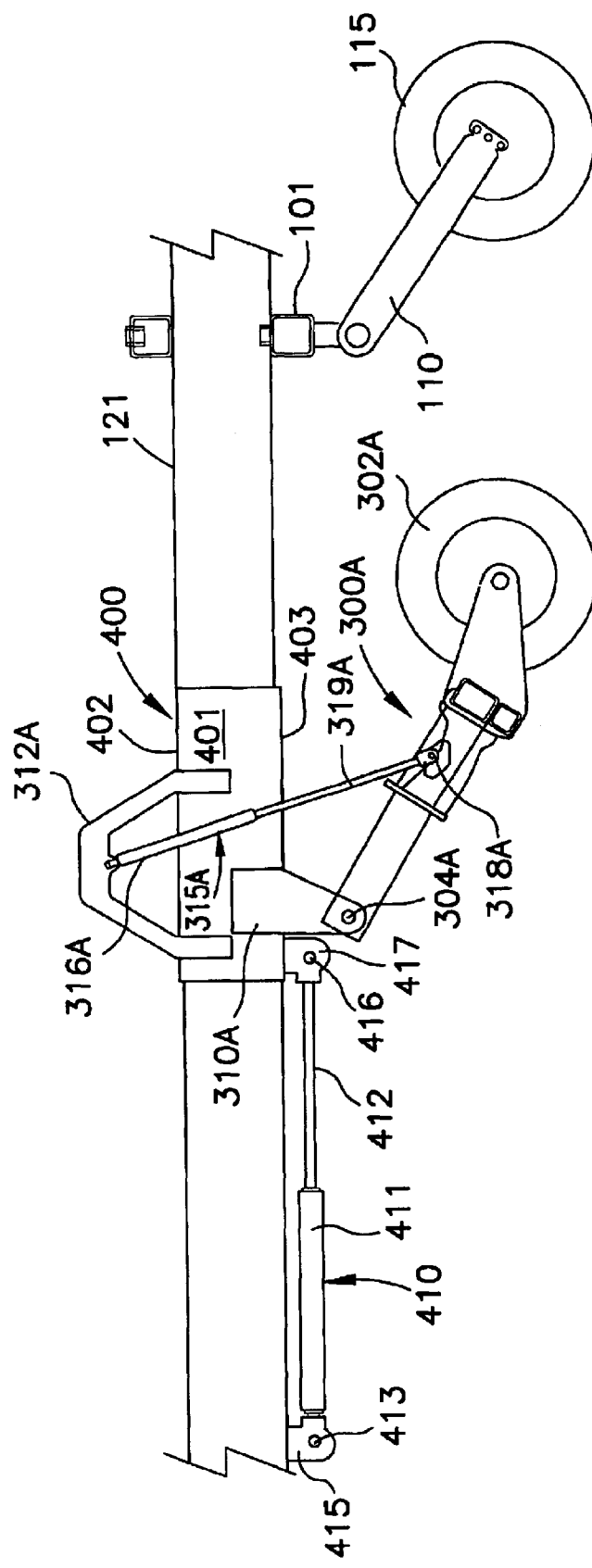
FIG. 21 is a partial side elevational view of the new planter showing the transport wheels mounted to a slidable collar and extending rearwardly in a ground-engaging position with the planter lift wheels also in a ground-engaging position to put the planter in the most raised field position to facilitate movement of the wings forward for road transport.
Figure 22:
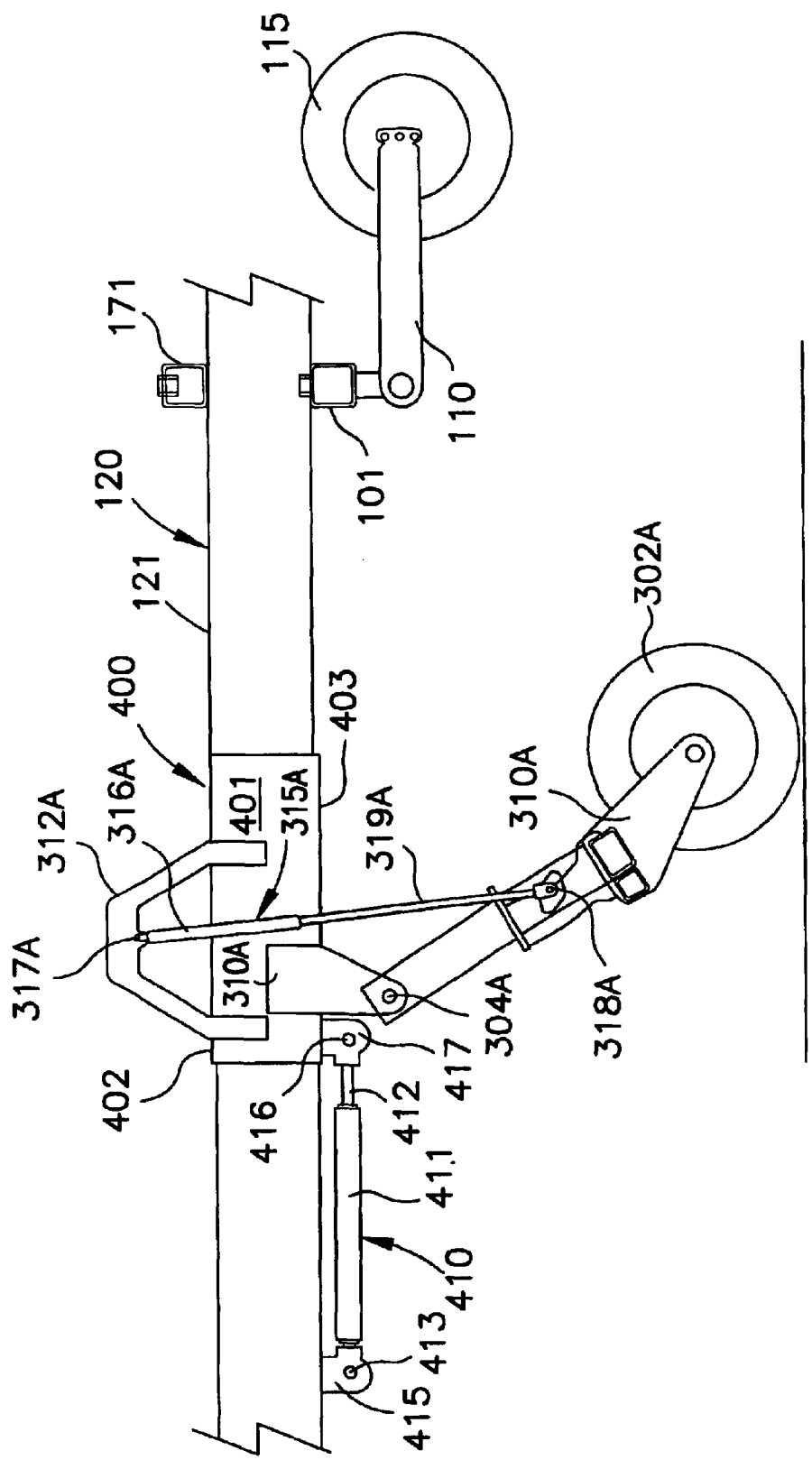
FIG. 22 is a partial side elevational view of the new planter showing the transport wheels mounted to a slidable sleeve in which the transport wheels are fully extended to raise the planter to a higher transport height with the field wheels in their lifted position, the transport wheels being moveable forward of the position illustrated in the drawing to change the center of gravity of the planter in the transport position.
Figure 23:
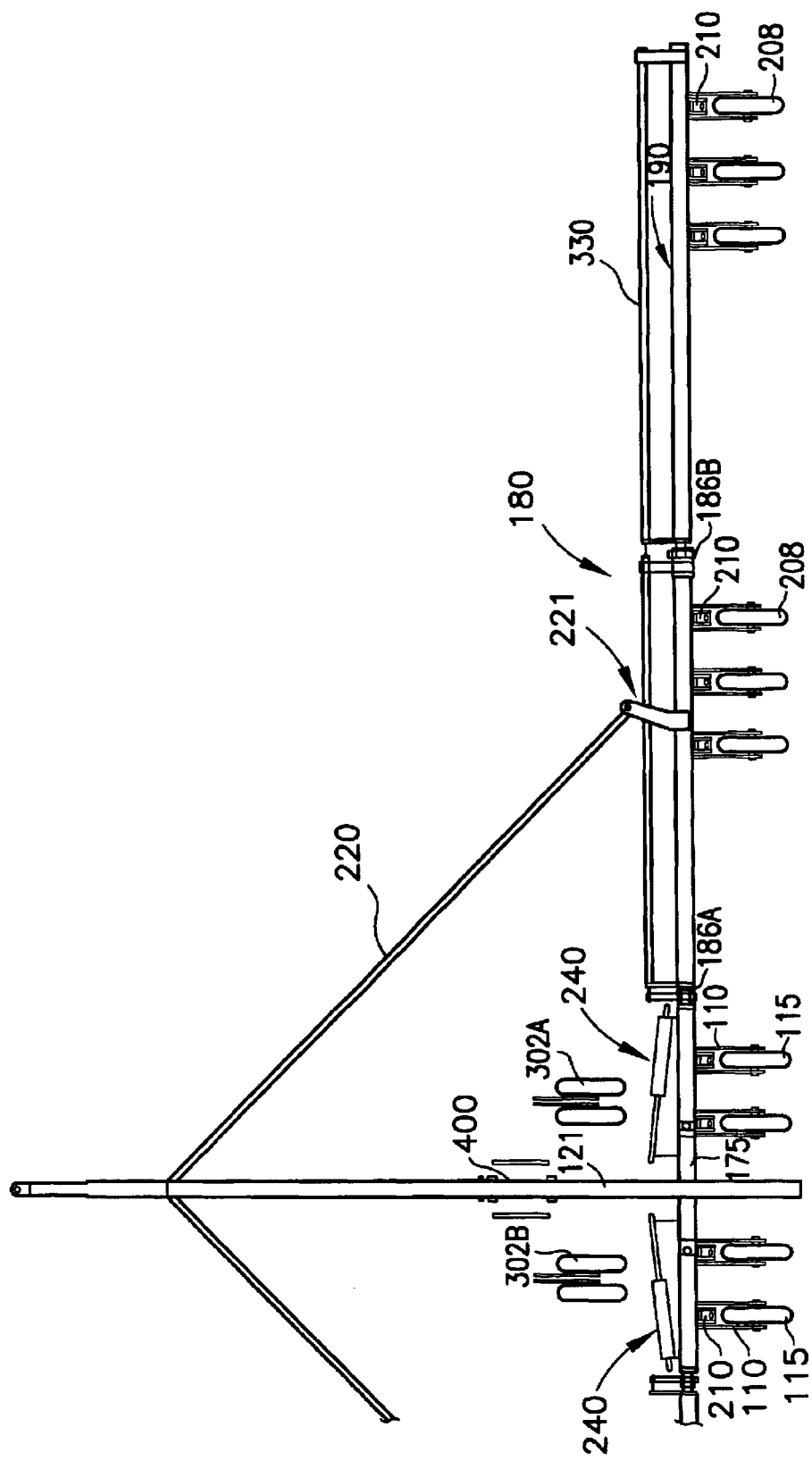
FIG. 23 is a partial top elevational view of the planter in the field-engaging position with transport wheels mountable on the slidable collar elevated and rearward, and in their rearward position.
Figure 24:
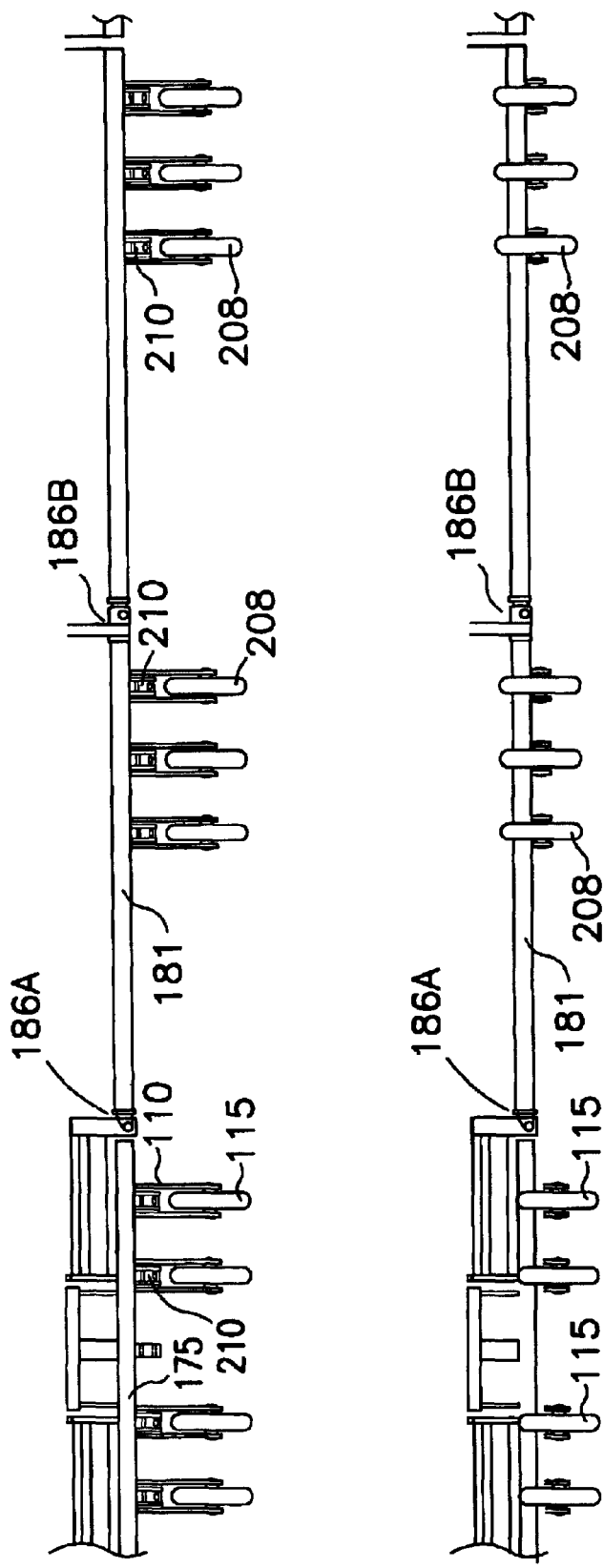
FIG. 24 are partial rear elevational views showing the additional hinge point of the new planter frame in the disengaged position with the latch mechanism in the disengaged position; (the top view is with the planter frame up and the bottom view is with the planter frame down)

As shown in FIGS. 20 and 21, the transport wheel assembly 300A is in the rear most position, the difference between FIGS. 20 and 21 is that the transport wheels are in their fully raised position in FIG. 20 while in FIG. 21 the transport wheels are moved further downwardly so as to put the planter 100 in its most raised field position. Movement from the position illustrated in FIGS. 20 and 21 is accomplished by actuation of the motor 315a. As illustrated in FIG. 22, the motor 315a has been fully actuated or extended in order to move the transport wheel assembly 300a to their fully extended position in order to raise the planter 100 to its highest transport height. In this position, the motor mechanism 410 has been actuated to move the sleeve assembly 400 to its forward most position, changing the center of gravity to prevent the front end of the draft vehicle from being lifted when the planter has a large number of row units, for instance in excess of 32 are employed.

Figure 25:
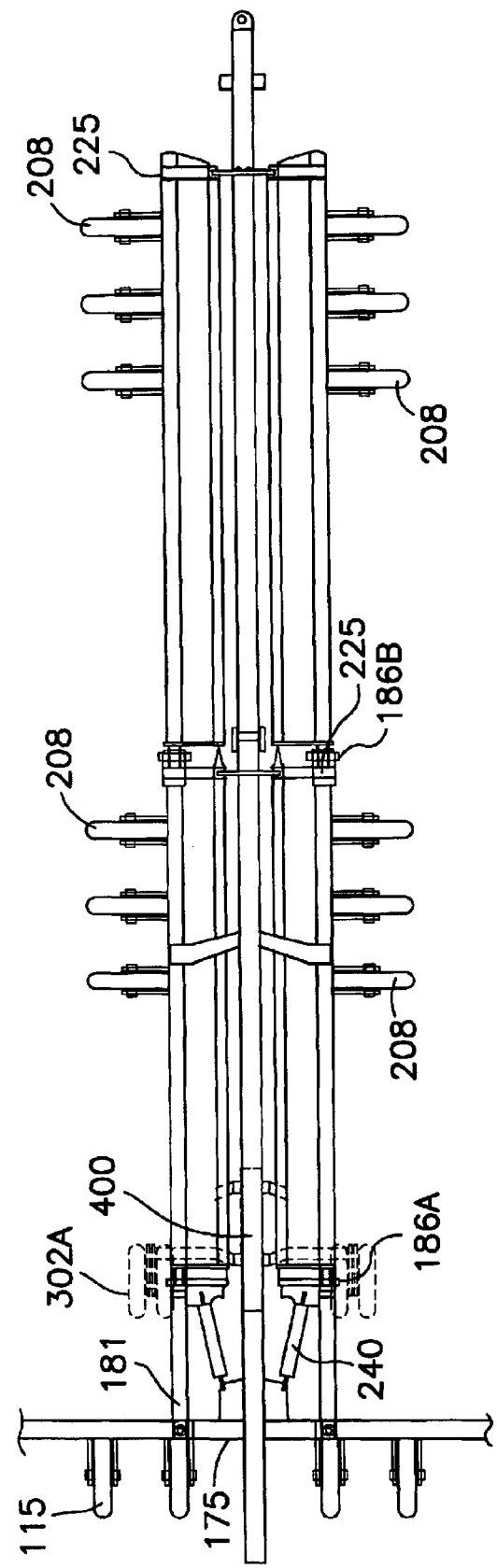
FIG. 25 is a partial top elevational view of the new planter in the forward folded transport position with the transport wheels down and in the rearward position illustrating the second transport latch in the latched position.
Figure 26:
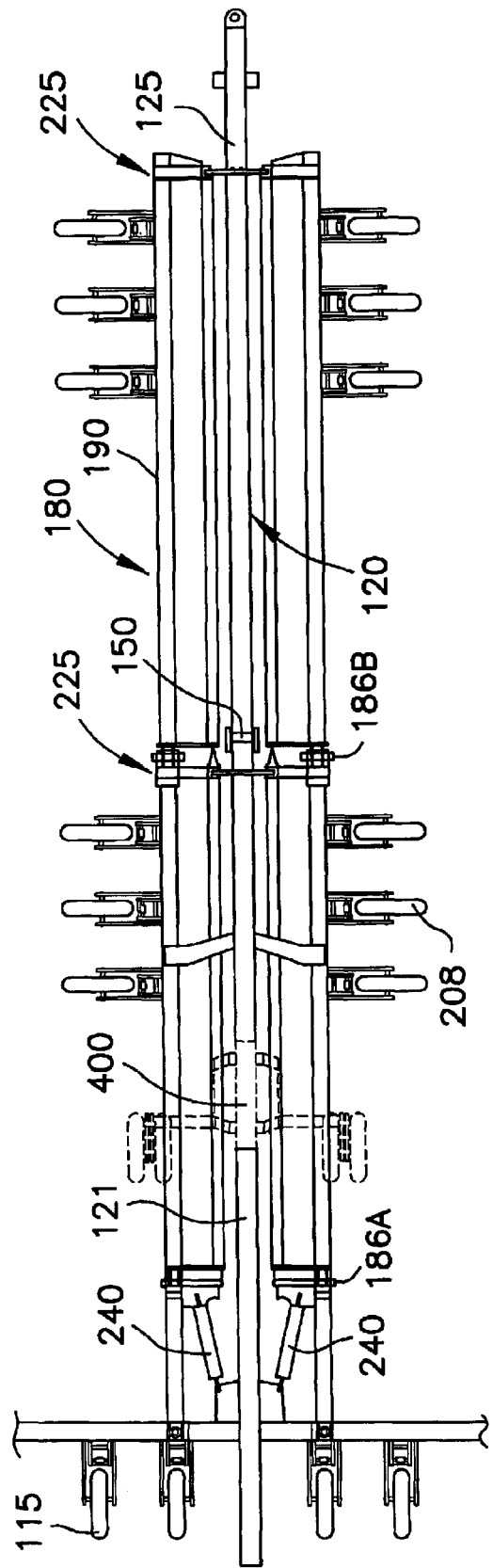
FIG. 26 is a partial top elevation view of the planter in the forward folded position for transport with planting lift wheels elevated and the transport wheels in their most extended position and forward changing the planter's center of gravity for transport.

FIGS. 25 and 26 are illustrative of the movement of the transport wheel assembly 300A and the sleeve assembly 400 between the position in which the transport wheels are in their rearmost position and on the ground as illustrated in FIG. 25 and when the planter 100 in its transport position in which the transport wheels 302A, B are in their most extended position, that is the planter is the highest off the ground, and the sleeve assembly 400 with the transport wheels 302A, B are moved forwardly to change the planter center of gravity.

Figure 27:
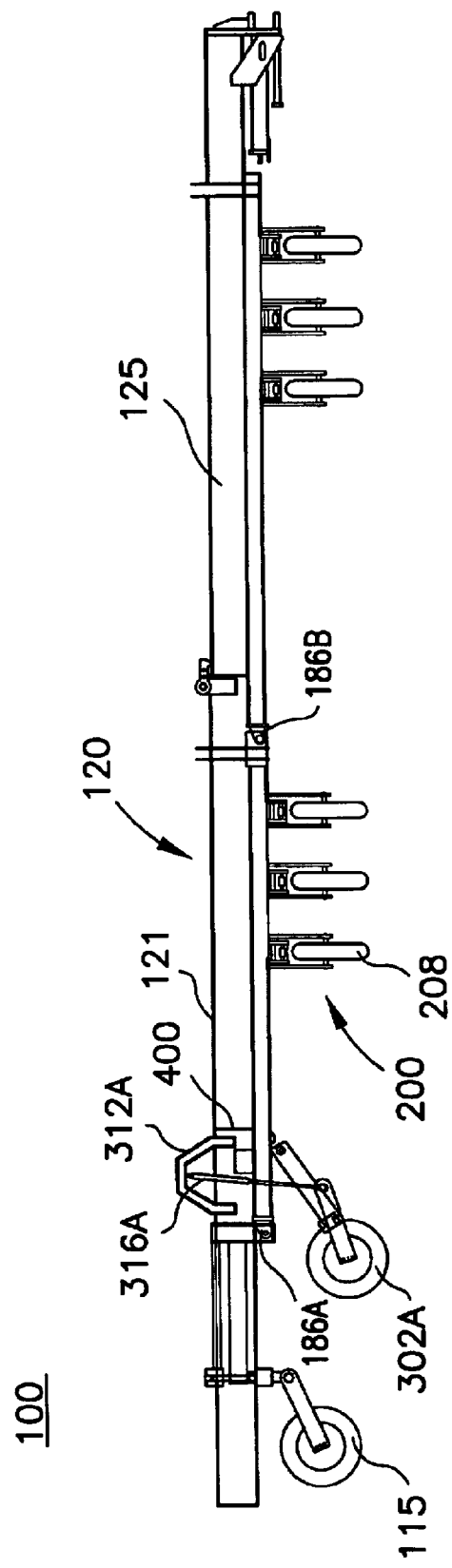
FIG. 27 is a partial a side elevational view of the planter illustrated in FIG. 25 showing the transport wheels mounted on a sliding collar in the position illustrated in FIG. 25.
Figure 28:
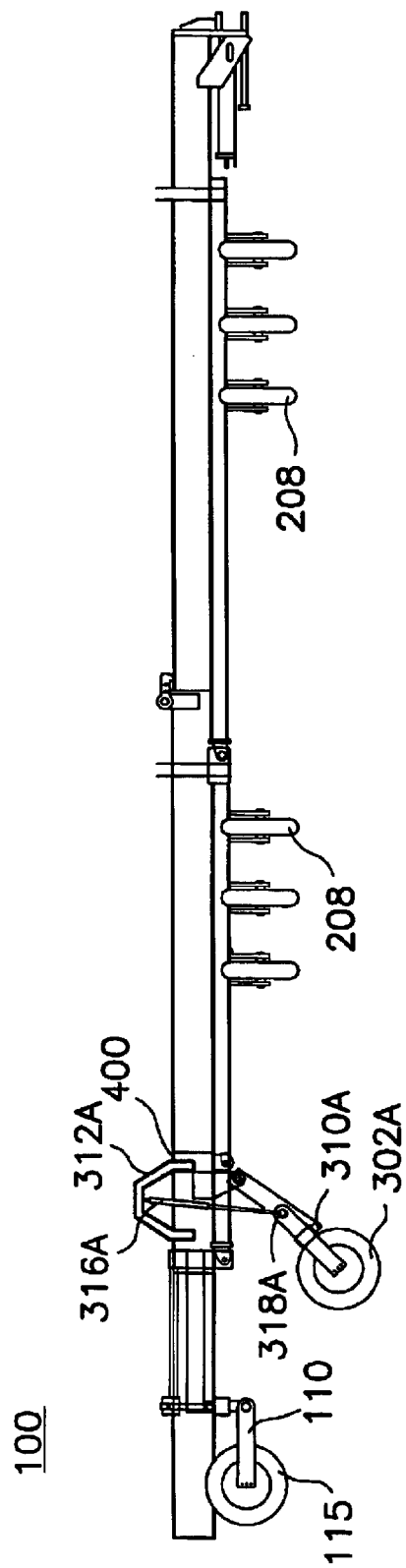
FIG. 28 is a partial side elevational view of the planter in the forward transport position with the transport wheels mounted on a slidable collar fully extended and in the forward position thereof.

FIG. 27 is a side view of the planter in the position shown in FIG. 25 and FIG. 28 and shows the planter lift wheels 208 in the fully retracted position but the transport wheels 302A, B have yet to be moved forward.

Figure 29:
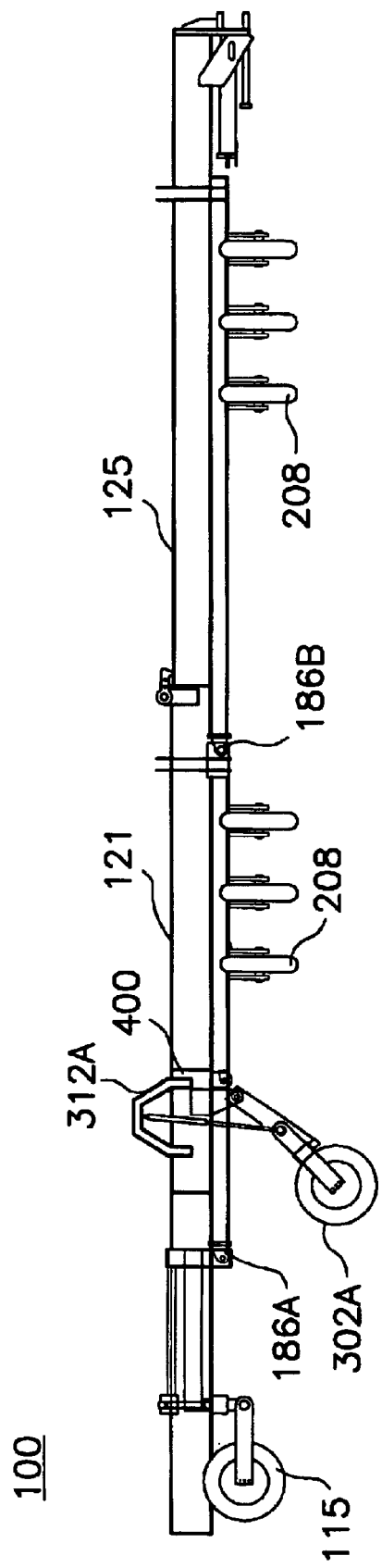
FIG. 29 is a partial side elevational view of the planter in the forward transport position changing the planter's center of gravity.

FIG. 29, on the other hand, shows the relative change in position of the transport wheels 302A, B between the rearmost position thereof and the forward most position thereof.

Another important feature of the present invention is the use of the two pivots 186A which were previously disclosed in the '950 patent and the additional pivot 186B in each wing, which is new in the present planter. The addition of the pivot 186B greatly facilitates the use of large multiple row planters with large numbers of row units, particularly greater than 32 and relieves stress in the extended wing assemblies as well as facilitating greater ground following by the planter 100. Because the planter 100 may accommodate 48 row units, there may be provided two latch assemblies 260 and 260A, the mechanism of which was previously described in the '581 patent and will not be herein described further. The distances between the pivots 186A and 186B depends on the number of row units employed, for instance, the pivots may be 210 inches apart for a 36 row planter 100, but only 180 inches apart for a 32 row planter.

While there has been disclosed what is considered to be the preferred embodiment of the present intention, it is understood that various changes in the details may be made without departing from the spirit, or sacrificing any of the advantages of the present invention.

I claim:

1. A foldable implement frame and hitch having a front end for attachment to a draft vehicle, comprising a support frame connected to a main frame including at least two telescoping frame members, two wing frames pivotally mounted on said support frame respectively on either side of said main frame for movement between extended working positions wherein said wing frames are in general alignment with said support frame and retracted positions, motors operable for moving said wing frames between the extended working positions and the retracted positions, a plurality of field wheels mounted on said support frame and said wing frames for supporting said foldable implement frame on the ground when said wing frames are in the extended working positions, motors operable for moving said field wheels from ground engaging positions to stored positions, dedicated transport wheels mounted on said main frame movable between a stored position wherein the transport wheels are out of contact with the ground and a transport position wherein the dedicated transport wheels engage the ground and support the implement frame with the wing frames in a retracted position, said dedicated transport wheels being longitudinally movable along at least one of said telescoping main frame members toward and away from the draft vehicle to change the center of gravity of said foldable implement frame, and motors operable to move said dedicated transport wheels between the stored and transport positions and longitudinally with respect to said support and main frames, said transport wheels in the transport position being a preselected and variable distance from the front end of said foldable implement frame to change the center of gravity of said foldable implement frame in response to the weight of said foldable implement frame and any equipment mounted thereon.

2. The device of claim 1, wherein said dedicated transport wheels are infinitely adjustable longitudinally of said support and/or main frame.

3. The device of claim 1, wherein said transport wheels comprise two pair of wheels, an inboard pair and an outboard pair, the center to center distance between the outboard pair being not greater than about 84 inches.

4. The device of claim 2, wherein said transport wheels comprise two pair of wheels, an inboard pair and an outboard pair, the center to center distance between the inboard pair being about 52 inches.

5. The device of claim 2, wherein said transport wheels comprise two pair of wheels, an inboard pair and an outboard pair, the center to center distance between the outboard pair being not greater than about 84 inches, the center to center distance between the inboard pair being about 52 inches.

6. The device of claim 2, wherein said transport wheels comprise two pair of wheels, an inboard pair and an outboard pair, one of each inboard and outboard pair being positioned on one side of said main frame and being provided with a dedicated hydraulic motor to move each of said inboard and outboard wheels between the stored and transport positions thereof.

7. The device of claim 1, wherein said telescoping members are elongated tubular inner and outer members, said dedicated transport wheels being mounted on said outer elongated tubular member.

8. The device of claim 7, wherein said motors operable to move said dedicated transport wheels are mounted on said outer elongated tubular member.

9. The device of claim 1, wherein said wing frames are mounted to said support frame by joints to permit both pivotal movement and vertical movement in the field.

10. The device of claim 9, wherein each of said wing frame has another joint therein for vertical movement intermediate said joint connecting said wing frame to said support frame and the distal end of said wing frame.

11. A foldable implement frame and hitch having a front end for attachment to a draft vehicle, comprising a support frame connected to a main frame including at least two telescoping frame members, two wing frames pivotally mounted on said support frame respectively on either side of said main frame for movement between extended working positions wherein said wing frames are in general alignment with said support frame and retracted positions, motors operable for moving said wing frames between the extended working positions and the retracted positions, a plurality of field wheels mounted on said support frame and said wing frames for supporting said foldable implement frame on the ground when said wing frames are in the extended working positions, motors operable for moving said field wheels from ground engaging positions to stored positions, dedicated transport wheels mounted on said main frame movable between a stored position wherein the transport wheels are out of contact with the ground and a transport position wherein the dedicated transport wheels engage the ground and support the implement frame with the wing frames in a retracted position, said dedicated transport wheels being mounted on a sleeve slidable with respect to at least one of said telescoping main frame members toward and away from the draft vehicle to change the center of gravity of said foldable implement frame, and motors operable to move said dedicated transport wheels between the stored and transport positions and longitudinally with respect to said support and main frames, said transport wheels in the transport position being a preselected and variable distance from the front end of said foldable implement frame to change the center of gravity of said foldable implement frame in response to the weight of said foldable implement frame and any equipment mounted thereon.

12. The device of claim 11, wherein said sleeve is slidable of not less than about four feet longitudinally of at least one of said telescoping main frame members.

13. The device of claim 12, wherein said main frame includes inner and outer longitudinally extending telescoping tubular members.

14. The device of claim 13, wherein said sleeve is mounted on said outer longitudinally extending tubular telescoping frame members.

15. The device of claim 14, wherein a hydraulic motor is mounted on said outer longitudinally extending tubular telescoping frame member and is connected to said sleeve to provide sliding movement of said sleeve and said transport wheels mounted thereon along said main frame.

16. The device of claim 15, wherein said wing frames are mounted to said support frame by joints to permit both pivotal movement and vertical movement in the field.

17. The device of claim 15, wherein each of said wing frame has another joint therein for vertical movement intermediate said joint connecting said wing frame to said support frame and the distal end of said wing frame.

18. A foldable implement frame and hitch having a front end for attachment to a draft vehicle, comprising a support frame connected to a main frame including at least two telescoping frame members, two wing frames pivotally mounted on said support frame respectively on either side of said main frame for movement between extended working positions wherein said wing frames are in general alignment with said support frame and retracted positions, motors operable for moving said wing frames between the extended working positions and the retracted positions, a plurality of field wheels mounted on said support frame and said wing frames for supporting said foldable implement frame on the ground when said wing frames are in the extended working positions, motors operable for moving said field wheels from ground engaging positions to stored positions, dedicated transport wheels mounted on said main frame movable between a stored position wherein the transport wheels are out of contact with the ground and a transport position wherein the dedicated transport wheels engage the ground and support the implement frame with the wing frames in a retracted position, said dedicated transport wheels being pivotally mounted on a sleeve slidable with respect to at least one of said telescoping main frame members toward and away from the draft vehicle to change the center of gravity of said foldable implement frame, said pivotal mounting of said transport wheels being forward of the axis of rotation of said transport wheels in both the stored and transport positions thereof, and motors operable to move said dedicated transport wheels between the stored and transport positions and longitudinally with respect to said support and main frames, said transport wheels in the transport position being a preselected and variable distance from the front end of said foldable implement frame to change the center of gravity of said foldable implement frame in response to the weight of said foldable implement frame and any equipment mounted thereon.

19. The device of claim 18, wherein said main frame includes inner and outer longitudinally extending telescoping tubular members.

20. The device of claim 19, wherein a hydraulic motor is mounted on said outer longitudinally extending tubular telescoping frame member and is connected to said sleeve to provide sliding movement of said sleeve and said transport wheels mounted thereon along said main frame.

21. The device of claim 20, wherein each wing frame has at least two joints therein providing vertical movement of said wing frame vertically to follow contours in the ground.

22. The device of claim 18, wherein said motor for moving said transport wheels between the stored and transport positions is mounted on said sleeve and said motor for slidably moving said sleeve and connects said sleeve and said main frame.

23. A foldable implement frame and hitch having a front end for attachment to a draft vehicle, comprising a support frame connected to a main frame including at least two telescoping frame members, two wing frames pivotally mounted on said support frame respectively on either side of said main frame for movement between extended working positions wherein said wing frames are in general alignment with said support frame and retracted positions and for vertical movement in the field, each wing frame having at least one joint thereon for vertical movement in the field, a plurality of field wheels mounted on said support frame and said wing frames for supporting said foldable implement frame on the ground when said wing frames are in the extended working positions, motors operable for moving said field wheels from ground engaging positions to stored positions, dedicated transport wheels mounted on said main frame movable between a stored position wherein the transport wheels are out of contact with the ground and a transport position wherein the dedicated transport wheels engage the ground and support the implement frame with the wing frames in a retracted position, said dedicated transport wheels being longitudinally movable along at least one of said support frames toward and away from the draft vehicle to change the center of gravity of said frame, and motors operable to move said dedicated transport wheels between the stored and transport positions and longitudinally with respect to said support and main frames, said transport wheels in the transport position being a substantial distance from said support frame toward the front end of said foldable implement frame.

* * * * *